(12) United States Patent
Plate et al.

(10) Patent No.: US 12,705,367 B2
(45) **Date of Patent: *Aug. 11, 2026**

(54) CREATING A PATCHED ARTIFACT BY BACK-PROPAGATING A FIX USING AN AUTOMATED PROCESS

(71) Applicant: Endor Labs Inc, Palo Alto, CA (US)

(72) Inventors: Henrik Plate, Valbonne (FR); Sebastian Cai, Palo Alto, CA (US); Dimitrios Styliadis, San Jose, CA (US); Alexandre Wilhelm, Kilauea, HI (US)

(73) Assignee: Endor Labs Inc, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/452,522

(22) Filed: Jan. 19, 2026

(65) Prior Publication Data

US 2026/0141083 A1 May 21, 2026

Related U.S. Application Data

(63) Continuation of application No. 19/270,079, filed on Jul. 15, 2025, which is a continuation of application (Continued)

(51) Int. Cl.
*G06F 21/57* (2013.01)
*G06F 21/62* (2013.01)

(Continued)

(52) U.S. Cl.
CPC ........ *G06F 21/577* (2013.01); *G06F 21/6218* (2013.01); *G06F 21/552* (2013.01); *G06F 21/565* (2013.01); *G06F 21/70* (2013.01)

(58) Field of Classification Search
None
See application file for complete search history.

(56) References Cited

U.S. PATENT DOCUMENTS 9,064,134 B1 * 6/2015 Agarwal ............... G06F 21/577
10,108,975 B1 10/2018 Benner et al.

(Continued)

FOREIGN PATENT DOCUMENTS

CN 104321782 1/2015
CN 113377431 A * 9/2021 .............. G06F 8/41
CN 118133284 A 6/2024

OTHER PUBLICATIONS

Aline Brito et al., "APIDiff: Detecting API breaking changes," 2018 [retrieved Jun. 22, 2025], 2018 IEEE 25th International Conference on Software Analysis, Evolution and Reengineering, pp. 507-511, downloaded from :https://ieeexplore.ieee.org. (Year: 2018) 5 pages.

(Continued)

*Primary Examiner* — Ali H. Cheema
(74) *Attorney, Agent, or Firm* — Shiv S. Naimpally; Sikander Khan; Flagship Patents

(57) ABSTRACT

In some implementations, a server determines that project code in a development system references an older version of a component in a third-party library and that a newer version of the component has a fix commit that addresses a vulnerability in the older version. The system determines a subset of code changes associated with the fix commit that addresses the vulnerability. The system submits, via a network, a pull request to create a branch in a developer platform. In the branch: a patch is created based on the subset of the code changes associated with the fix commit, the patch is applied to the older version of the component to create a patched component, and after the patch is successfully validated in the branch, the patched component and information associated with the patch is uploaded to a registry to enable a software developer to download and use the patched component.

20 Claims, 10 Drawing Sheets

Related U.S. Application Data

No. 19/020,659, filed on Jan. 14, 2025, now Pat. No. 12,386,981, which is a continuation of application No. 18/951,189, filed on Nov. 18, 2024, now Pat. No. 12,361,141, which is a continuation of application No. 18/740,976, filed on Jun. 12, 2024, now Pat. No. 12,189,788.

(60) Provisional application No. 63/680,135, filed on Aug. 7, 2024, provisional application No. 63/552,793, filed on Feb. 13, 2024, provisional application No. 63/472,561, filed on Jun. 12, 2023, provisional application No. 63/472,562, filed on Jun. 12, 2023, provisional application No. 63/472,557, filed on Jun. 12, 2023.

(51) Int. Cl.

| | |
|---|---|
| *G06F 21/55* | (2013.01) |
| *G06F 21/56* | (2013.01) |
| *G06F 21/70* | (2013.01) |

(56) References Cited

U.S. PATENT DOCUMENTS

| | | | | |
|---|---|---|---|---|
| 10,379,995 | B1 | 8/2019 | Walters et al. | |
| 10,754,643 | B2 | 8/2020 | Arquero et al. | |
| 11,204,690 | B1 * | 12/2021 | Hoberman | G06F 3/04842 |
| 11,544,050 | B1 * | 1/2023 | Ankit | G06F 21/629 |
| 2005/0055565 | A1 | 3/2005 | Fournet et al. | |
| 2006/0282479 | A1 | 12/2006 | Johnson et al. | |
| 2006/0282480 | A1 | 12/2006 | Johnson et al. | |
| 2006/0288054 | A1 | 12/2006 | Johnson et al. | |
| 2006/0288055 | A1 | 12/2006 | Johnson et al. | |
| 2010/0153908 | A1 | 6/2010 | Sarkar et al. | |
| 2011/0055153 | A1 | 3/2011 | Hashimoto et al. | |
| 2011/0078674 | A1 | 3/2011 | Ershov | |
| 2013/0083030 | A1 | 4/2013 | Fukuda et al. | |
| 2014/0201573 | A1 * | 7/2014 | Huang | G06F 11/0721 714/38.1 |
| 2014/0289697 | A1 | 9/2014 | Wenda et al. | |
| 2016/0259636 | A1 | 9/2016 | Plate et al. | |
| 2018/0239898 | A1 * | 8/2018 | Haerterich | G06F 21/577 |
| 2018/0314622 | A1 | 11/2018 | Lowe et al. | |
| 2019/0272378 | A1 | 9/2019 | Hirvimies et al. | |
| 2021/0182391 | A1 * | 6/2021 | Plate | G06N 20/00 |
| 2021/0281597 | A1 | 9/2021 | Guiroux et al. | |
| 2022/0222351 | A1 | 7/2022 | Levin et al. | |
| 2022/0342680 | A1 | 10/2022 | Darke et al. | |
| 2023/0061121 | A1 | 3/2023 | Tosevska et al. | |
| 2024/0169069 | A1 * | 5/2024 | Panicker | G06F 21/577 |
| 2024/0241963 | A1 * | 7/2024 | Wareus | G06F 21/577 |
| 2024/0385823 | A1 * | 11/2024 | Hoole | G06F 8/65 |

OTHER PUBLICATIONS

Lina Ochoa et al., “BreakBot: Analyzing the Impact of Breaking Changes to Assist Library Evolution,” 2022 [retrieved Jun. 25, 2025], Proceedings of the ACM/IEEE 44th International Conference on Software Engineering: New Ideas and Emerging Results, pp. 26-30 , downloaded from :https://dl.acm.org. (Year: 2022).

Nikolaos Tsantalis et al., “Refactoring Miner 2.0,” 2022 [retrieved Jun. 27, 2025], IEEE Transactions on Software Engineering, vol. 48, Issue 3, pp. 930-950, downloaded from :https://ieeexplore.ieee.org. (Year: 2022) 21 pages.

* cited by examiner

500

502 — Parents index

| Type | Ordered list of parents |
|---|---|
| /apppackage/App | [/java.lang/Object] |
| /dep2package/Dep2 | [/java.lang/Object] |
| /dep1package/Dep1 | [/dep2package/Dep2,/java.lang/Object] |
| 508 | 510 |

504 — Defined Methods

| Type | Signature | pkg |
|---|---|---|
| /apppackage/App | main(/java.lang/String[]) | app:0 |
| | m1() | app:0 |
| | <init>() | app:0 |
| /dep2package/Dep2 | target() | dep2:0 |
| | m1() | dep2:0 |
| | m2() | dep2:0 |
| | <init>() | dep2:0 |
| /dep1package/Dep1 | m1() | dep1:0 |
| | source() | dep1:0 |
| | create()/dep2package/Dep2 | dep1:0 |
| | <init>() | dep1:0 |
| | m2() | dep2:0 |
| | target() | dep2:0 |
| 512 | 514 | 516 |

506 — Children Index

| Type | Set of all children |
|---|---|
| /apppackage/App | {} |
| /dep2package/Dep2 | {/dep1package/Dep1} |
| /dep1package/Dep1 | {} |
| /java.lang/Object | {/apppackage/App, /dep2package/Dep2, /dep1package/Dep1} |
| 518 | 520 |

FIG. 5

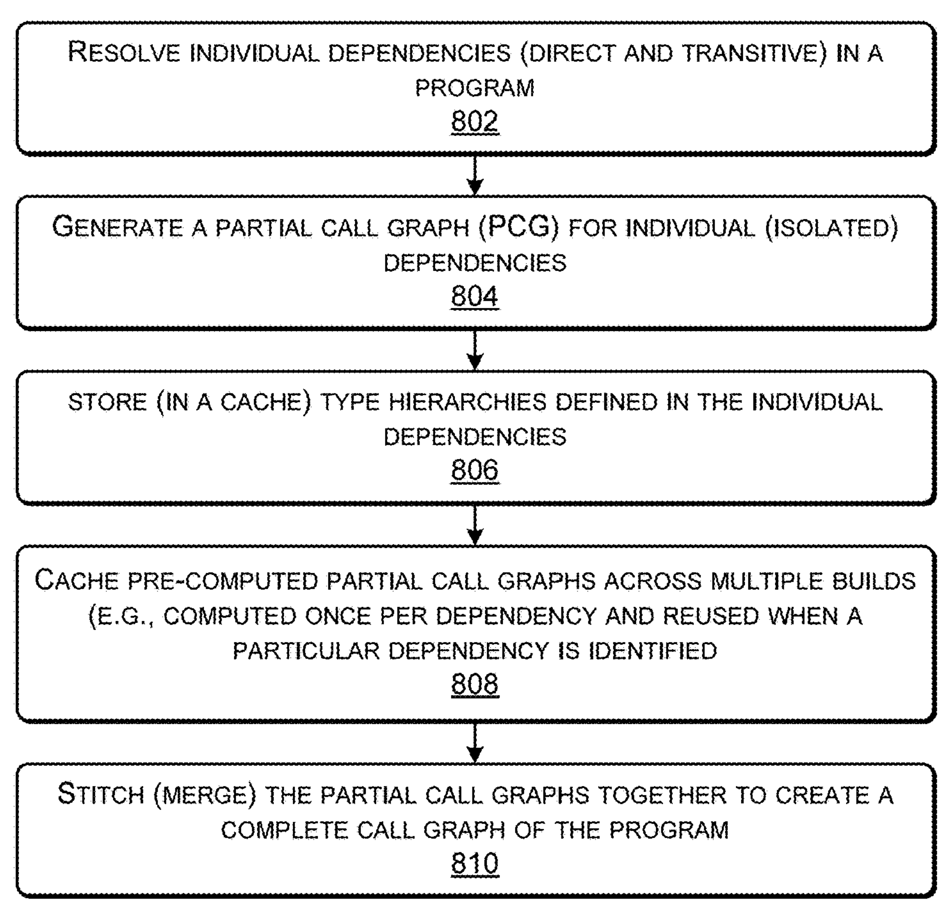
FIG. 8

CREATING A PATCHED ARTIFACT BY BACK-PROPAGATING A FIX USING AN AUTOMATED PROCESS

The present non-provisional patent application claims priority from (1) U.S. Non-Provisional application Ser. No. 19/270,079 filed on Jul. 15, 2025 entitled "AUTOMATED BACK-PROPAGATION OF A FIX USING A REPRODUCIBLE BUILD, TEST, AND VALIDATION PROCESS TO CREATE A PATCHED ARTIFACT", which is incorporated herein by reference in its entirety and for all purposes as if completely and fully set forth herein.

BACKGROUND

In recent years, software applications have increasingly relied on third-party components, many of which are released under open-source license. These components are typically declared as dependencies in the manifest files of the software applications, e.g., by specifying the name and version of the component to be used. Prebuilt open-source components or packages are made available on package registries. Package managers download these prebuilt packages from the registries according to the dependency declarations in the applications' manifest files, making the code included within these packages available in the applications' development or runtime environments.

However, these open-source components often suffer from security vulnerabilities, which can negatively impact the applications that use them, either directly or indirectly. To determine whether a particular application is affected by these vulnerabilities, code-level information about the vulnerability, such as the identifiers of vulnerable functions and the identifiers of components that include those functions, are identified. Obtaining such information enables developers to employ program analysis techniques, such as static analysis or dynamic analysis, to study the vulnerable component and its use in the context of a given application. For example, reachability analysis, determines whether a particular function that is part of an open-source component can be reached by an application that directly or indirectly uses the particular function.

When a developer of a software package that uses a component in a third library determines that the component has a vulnerability, the developer may consider upgrading the software package to use a newer version of the component. Typically, multiple newer versions of the component are available. For example, the developer may be using V1.X (X>=0) while newer versions V2.1, V2.2 or higher may be available. A newer version may fix the vulnerability but may introduce other issues, such as, for example, breaking the functionality of the package (e.g., causing it to function in a manner different than the developer intended, referred to as a breaking change), being larger in size, or other issues. It is challenging and time consuming for the developer to review the newer versions available for each third-party component that the developer's code uses to determine which newer version of each component to use, particularly with open-source libraries that are maintained by a third party.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some implementations, a server determines that project code in a development system references an older version of a component in a third-party library and that a newer version of the component has a fix commit that addresses a vulnerability in the older version. The system determines a subset of code changes associated with the fix commit that addresses the vulnerability. The system submits, via a network, a pull request to create a branch in a developer platform. In the branch: a patch is created based on the subset of the code changes associated with the fix commit, the patch is applied to the older version of the component to create a patched component, and after the patch is successfully validated in the branch, the patched component and information associated with the patch is uploaded to a registry to enable a software developer to download and use the patched component.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 5 illustrates a global type hierarchy (GTH) of example versioned packages, according to some embodiments.

FIG. 8 is a process that includes stitching (merging) partial graphs, according to some embodiments.

DETAILED DESCRIPTION

Figure 1:
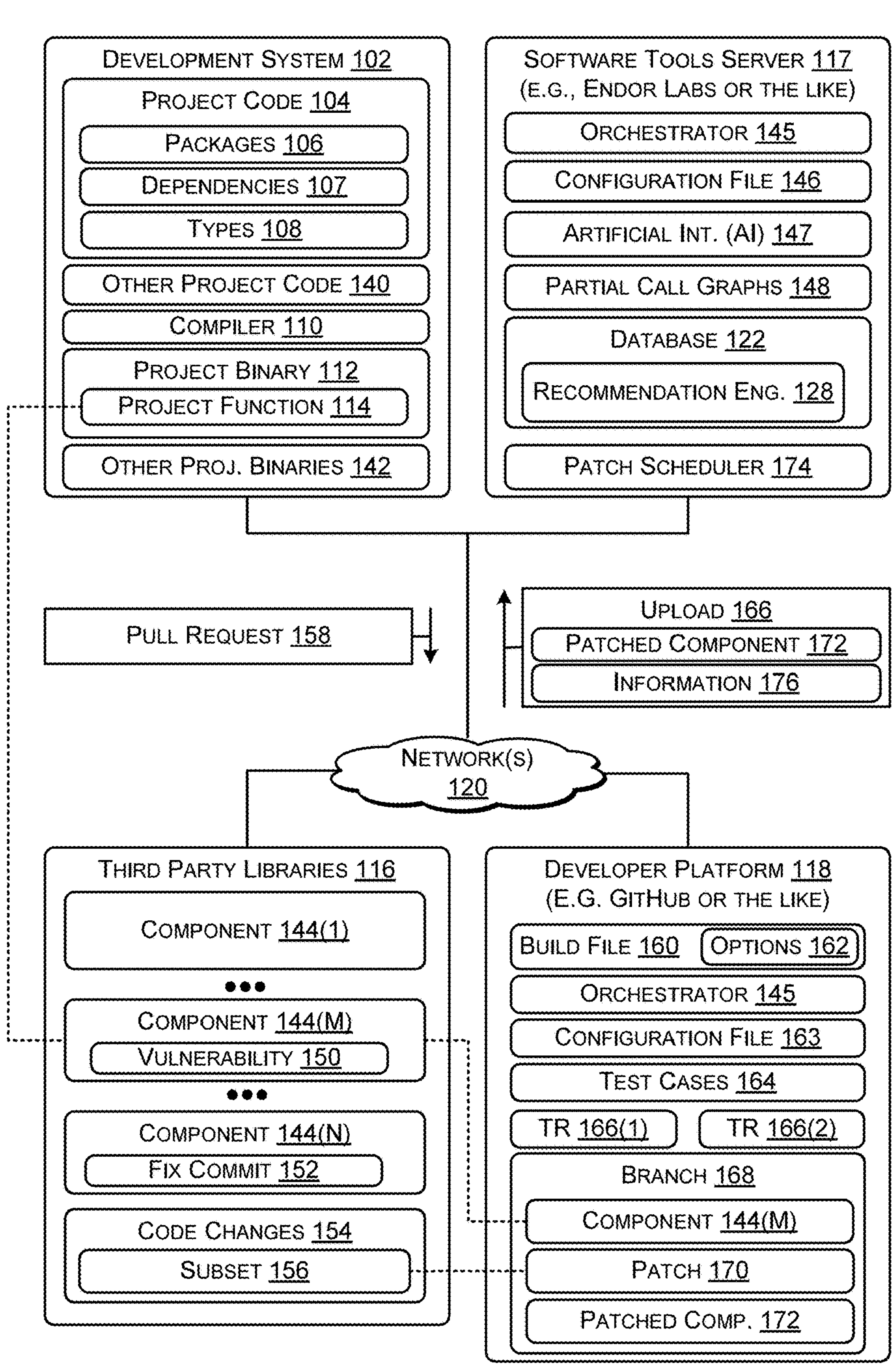
FIG. 1 illustrates a system to reproducibly build, test, and validate a patched artifact, according to some embodiments.

It should be understood that the following descriptions, while indicating preferred aspects and numerous specific details thereof, are given by way of illustration only and should not be treated as limitations. Changes and modifications may be made within the scope herein without departing from the spirit and scope thereof, and the present invention herein includes all such modifications.

The systems and techniques described herein enhance the security of software applications that use third-party components by determining using an automated process to down port a security fix done (by open-source project maintainers) in a relative recent release. The fix is down ported, e.g., ported to an older, unsupported release, including, for example, an end-of-life (EOL) release. For example, assume an open-source project provides a fix for a vulnerability in version (V) N.X (N>1, X>=0, such as V 2.2), though the vulnerability is present in an older version V M.Y (M<N, Y>=0), such as V 1.3). The systems and techniques determine a smallest possible code change in the fix (e.g., V 2.2) that addresses the vulnerability and ports it back (down port) and applies it to the older version (e.g., V 1.3). For example, a fix commit in a newer version (e.g., V 2.2) may address multiple vulnerabilities, including a first vulnerability present in the older version (e.g., V 1.3) and a second vulnerability present in a more recent version (e.g., V 2.1 or V 2.0). The systems and techniques isolate the subset of code in the fix commit that addresses the first vulnerability and down port that subset to the older version.

The systems and techniques clone the repository that existed for the older version (e.g., V 1.3), identify, in a fix commit for a newer version, a subset of the code changes that address the vulnerability, apply the subset as a patch to the older version, and build, test, and validate a project that uses the older version. Validation involves verifying that the patch addresses the vulnerability, without introducing any breaking changes. Validation refers to (i) running test code to exploit the vulnerability in the older version and then (ii) re-running the test code on the patched version to determine that the patched version (with the down ported patch) is no longer vulnerable (vulnerability cannot be exploited). The systems and techniques create an artifact (e.g., V 1.3 with the patch applied) and upload the artifact (older version with the patch applied) to a private server of a software tools provider (such as Endor Labs) so that other clients of the software tools provider can access and use the artifact. For example, the artifact may be stored in a registry of the software tools provider. The term artifact refers to something created after performing a software. Typically, an artifact is one or more binary packages, such as Java archive (JAR), web application archive (WAR), ZIP, or the like, that is created when code (e.g., the older version with the patch applied) is compiled. The vulnerable version (e.g., V 1.3) may be made available along with the patch to enable a client to reproducibly build the artifact. A registry refers to a server-based application that enables software developers to store and manage container images.

Definitions

Definitions of key terms used herein are provided below. Some of these terms, as noted, may have different and/or overlapping meanings depending on the context.

Application: An application refers to a program that is the current focus of attention. It serves as the root of a dependency set and the starting point for analyses, such as dependency resolution. The application is also included in the dependency set.

Artifact: An artifact is a program distributed to users, offering features related to a core idea. Artifacts may evolve over time, addressing existing issues or adding new functionalities.

Breaking Change: A breaking change is a software modification to a component that disrupts compatibility with a previous version of the component. The breaking change causes the in component to function in a manner different from how it was intended to function.

Component: A component, also referred to as a method in Java, is a block of code that performs a specific task and is executed when called. A component is typically stored in a third party library to enable components to be reused.

Dependency: A dependency relationship occurs when one versioned package, such as A, includes (references) another versioned package, such as B, to utilize the functionality of B. In this example, A is considered the dependent program, while B is the dependency.

Dependency set: A dependency set includes versioned packages used by a program and required for the program to successfully compile. The process of determining the dependency set is referred to as dependency resolution.

Down port: Taking at least a portion of a patch applied to a component in a newer version of a component and applying the portion of the patch to an older version of the component.

End-of-life: An unsupported version of (older) software code. Typically, a newer version of the software code is available and so the developers support the newer version but not the older version.

Library: A library is a collection (set) of components that a program may use. A component in the library that is used by the program is a dependency because the program depends on the component to provide a particular functionality.

Method: A method, also referred to as a component herein, is a block of code designed to perform a specific task. Methods provide reusability and modularity, allowing a developer to write code once and use it multiple times.

Package: A package is synonymous with artifact and can be used interchangeably.

Package is also commonly used to denote namespaces within programs. To avoid confusion, the term "Java package" is used when referring to namespaces.

Program: A program refers to a piece of code written in any programming language, regardless of its size or distribution method.

Project: A project is a domain containing multiple packages. The term project is used to represent the domain holding a groupId and containing packages.

Repository: A location where software code, files related to the software code (e.g., build files, configuration files, and the like), revision history, and the like are stored.

Validation: Running test code to exploit a vulnerability in a component and then re-running the test code on the patched component to determine whether the patched version is no longer vulnerable (e.g., the vulnerability cannot be exploited).

Versioned package: A versioned package is a snapshot of an artifact at a specific point in time. Versioned packages are released on repositories ($3^{rd}$ party libraries) for use by others.

Vulnerability: A software vulnerability is a defect in software code that may enable an attacker to gain control of the software. Typically, the defect is unintentionally created and the original developer may be unaware of the vulnerability when the code is initially developed and made available.

Whole program: A whole program includes the code required for successful compilation, including any versioned package listed as a dependency (including direct dependencies and transitive dependencies).

As a first example, a method performed by a computer include determining, by one or more processors, that project code in a development system references an older version of a component in a third-party library. The method includes determining, by the one or more processors, that the older version of the component has a vulnerability. The method includes determining, by the one or more processors, that a newer version of the component in the third-party library has a fix commit that addresses the vulnerability. The method includes determining, by the one or more processors, code changes associated with the fix commit. The method includes determining, by the one or more processors, a subset of the code changes associated with the fix commit that addresses the vulnerability. The method includes creating, by the one or more processors, a patch based on the subset of the code changes associated with the fix commit. The method includes applying, by the one or more processors, the patch to the older version of the component to create a patched component. The method includes validating the patch by the one or more processors. Based on successfully validating the patch, the method includes building and uploading, by the one or more processors, the patched component and information associated with the patch to a registry to enable a software developer to download and use the patched component. The information may enable the software developer to reproducibly build the patched component. Validating the patch by the one or more processors may include executing a set of test cases on a first build that includes the older version of the component to create first test results, determining that the first test results indicate that the set of test cases exploited the vulnerability in the older version of the component, executing the set of test cases on a second build that includes the patched component to create second test results, and determining that the second test results indicate that the set of test cases did not exploit the vulnerability in the patched component. The method may include generating a static call graph associated with the second build that includes the patched component, determining a coverage of the set of test cases based on the static call graph, and verifying, based on the coverage, that the patched component provides the functions provided by the older version of the component. The method may include initiating a process to create the first build using a build file comprising build rules and build options. Based on the process to create the first build failing, the method may include modifying the build file to create a modified build file and re-initiating the process to create the first build using the modified build file. The method may include performing change impact analysis on the patched component and determining, based on the change impact analysis, that the patched component does not introduce a breaking change. The method may include submitting a pull request to create a branch in a developer platform, where: (i) creating the patch based on the subset of the code changes associated with the fix commit is performed in the branch, (ii) applying the patch to the older version of the component to create the patched component is performed in the branch, and (iii) validating the patch is performed in the branch.

As a second example, a server includes one or more processors and one or more non-transitory computer readable media storing instructions executable by the one or more processors to perform various operations. The operations include determining that project code in a development system references an older version of a component in a third-party library. The operations include determining that the older version of the component has a vulnerability. The operations include determining that a newer version of the component in the third-party library has a fix commit that addresses the vulnerability. The operations include determining code changes associated with the fix commit. The operations include determining a subset of the code changes associated with the fix commit that addresses the vulnerability. The operations include creating a patch based on the subset of the code changes associated with the fix commit. The operations include applying the patch to the older version of the component to create a patched component. The operations include validating the patch. Based on successfully validating the patch, the operations include building and uploading the patched component and information associated with the patch to a server to enable a software developer to download and use the patched component. The information may enable the software developer to reproducibly build the patched component. Validating the patch may include: executing a set of test cases on a first build that includes the older version of the component to create first test results, determining that the first test results indicate that the set of test cases exploited the vulnerability in the older version of the component, executing the set of test cases on a second build that includes the patched component to create second test results, and determining that the second test results indicate that the set of test cases did not exploit the vulnerability in the patched component. The operations may include generating a static call graph associated with the second build that includes the patched component, determining a coverage of the set of test cases based on the static call graph, and verifying, based on the coverage, that the patched component provides the functions provided by the older version of the component. The operations may include initiating a process to create the first build using a build file comprising build rules and build options, based on the process to create the first build failing, modifying the build file to create a modified build file, and re-initiating the process to create the first build using the modified build file. Validating the patch may include executing a set of test cases on a first build that includes the older version of the component to create first test results, determining that the first test results indicate that the set of test cases exploited the vulnerability in the older version of the component, executing the set of test cases on a second build that includes the patched component to create second test results, determining that the second test results indicate that the set of test cases exploited the vulnerability in the patched component, modifying the patch to create a modified patch, executing the set of test cases on a third build that includes the modified patch to create third test results, and determining that the third test results indicate that the set of test cases did not exploit the vulnerability in the modified patch. The information associated with the patch may include: information identifying the older version of the component in a third-party library, information identifying the vulnerability, information identifying files used, information related to the build file, information related to the build options, one or more configuration details, or any combination thereof. The operations may include performing change impact analysis on the patched component. The operations may include determining, based on the change impact analysis, that the patch introduces a breaking change, modifying the patch to create a modified patch, and performing the change impact analysis using the modified patch.

As a third example, one or more non-transitory computer readable media capable of storing instructions executable by one or more processors may perform various operations. The operations include determining that project code in a development system references an older version of a component in a third-party library, determining that the older version of the component has a vulnerability, determining that a newer version of the component in the third-party library has a fix commit that addresses the vulnerability, determining code changes associated with the fix commit, determining a subset of the code changes associated with the fix commit that addresses the vulnerability, creating a patch based on the subset of the code changes associated with the fix commit, applying the patch to the older version of the component to create a patched component, validating the patch, and based on successfully validating the patch, uploading the patched component and information associated with the patch to a server to enable a software developer to reproducibly build the patch to address the vulnerability. The information may enable the software developer to reproducibly build the patch and the patched component. Validating the patch may include executing a set of test cases on a first build that includes the older version of the component to create first test results, determining that the first test results indicate that the set of test cases exploited the vulnerability in the older version of the component, executing the set of test cases on a second build that includes the patched component to create second test results, and determining that the second test results indicate that the set of test cases did not exploit the vulnerability in the patched component. The operations may include generating a static call graph associated with the second build that includes the patched component, determining a coverage of the set of test cases based on the static call graph, and verifying, based on the coverage, that the patched component provides the functions provided by the older version of the component. The operations include initiating a process to create the first build using a build file comprising build rules and build options; based on the process to create the first build failing, modifying the build file to create a modified build file, and re-initiating the process to create the first build using the modified build file. The operations may include performing change impact analysis on the patched component and determining, based on the change impact analysis, that the patched component does not introduce a breaking change. The operations may include submitting a pull request to create a branch in a developer platform, creating, in the branch, the patch based on the subset of the code changes associated with the fix commit, applying, in the branch, the patch to the older version of the component to create the patched component, and validating, in the branch, the patch.

FIG. 1 illustrates a system 100 to reproducibly build, test, and validate a patched artifact, according to some embodiments. The system 100 includes a development system 102 (of a company that develops software), one or more third-party libraries 116, a software tools server (e.g., associated with Endor Labs or the like) 117, and a developer platform 118 (e.g., GitHub or the like) that are communicatively coupled via one or more networks 120. The four servers (102, 116, 117, 118) shown in FIG. 1 are purely for illustration purposes and the functionality described herein may be spread across fewer than four or more than four servers. In addition, while particular servers are shown as hosting particular software components, the software components illustrated in FIG. 1 may be hosted by different servers than the servers shown as hosting them in FIG. 1. Furthermore, the functions performed by individual software components may be combined into a single component or separated into multiple additional components based on how the software components are implemented.

The software tools server 117 may host an orchestrator 145, at least one configuration file 146, an artificial intelligence (AI) 147, partial call graphs 148, and a database 122 that includes a recommendation engine 128. The orchestrator 145 coordinates and automates the process of down porting a fix from a newer version of a component to an older version of the (same) component. The orchestrator 145 uses the configuration file 146 when orchestrating the down port of the fix.

The development system 102 include project code 104, packages 106, dependencies 107, and types 108. The development system 102 includes a compiler 110, a project binary 112 (binary code created by compiling the project code 104), a representative project function 114, and 3rd party libraries 116. The development system 102 is a software environment that enables software developers to create, modify, and manage the project code 104. The project code 104 includes the source code files of the software project that may be managed using a version control system (VCS), such as Git, Mercurial, or the like. The development system 102 may be part of an enterprise (company) that develops software. The enterprise may be a client of a software tools provider, such as Endor Labs, that provides tools used when developers at the client are developing the project code 104. The types 108 and dependencies 107 may include metadata associated with the project code 104. The types 108 may include information about the data types used in the project code 104, while the dependencies 107 may include information about the other software components that the project code (104) relies on for its functionality. The compiler 110 is a software tool that transforms the project code 104 into the project binary 112. The project binary 112 is the executable form of the software project that can be run on a computer system. The representative project function 114 is a specific part of the project code 104 that performs a particular task within the software project. Typically, a project binary has multiple project functions. For ease of understanding, the representative project function 114 is used to illustrate how the systems and techniques down port a fix. The project function 114 makes a call to one or more components, such as component 144(M), in one or more third-party libraries 116.

The one or more third-party libraries 116 may include open-source libraries or other types of libraries. The 3rd party libraries 116 are software components that are not developed by the project maintainers but are used within the software project to provide particular functions. These libraries include a component 144 with multiple versions: component 144(1), component 144(M) (M>0), and component 144(N) (N>M>0), where M and N are versions of the component). Thus, component 144(M) is an older version of the component while component 144(N) is a later (recent/newer) version of the component because N>M. The component 144(M) includes a vulnerability 150. The component 144(P) includes a fix commit 152 that addresses the vulnerability 150. In some cases, the fix commit 152 may address another vulnerability introduced in a component 144(M+1), where N>(M+1). The project function 114 in the project code 104 uses the component 144(M) that includes the vulnerability 150. For various reasons, the developer of the project code 104 may not desire to modify the project function 114 to use the component 144(N) in which the vulnerability 150 has been addressed (by the fix commit 152). The developer may desire to have the component 144(M) patched to address the vulnerability 150 and may use the systems and techniques described herein to automatedly determine code changes 154 associated with the fix commit 154 and automatedly identify a subset 156 of the code changes 154 that address the vulnerability 150. In some cases, the systems and techniques may use the artificial intelligence 146

The system 100 includes the development system 102 used by one or more programmers to create code, such as representative project code 104. The project code 104 is also referred to as source code and is written in a high-level language. The project code 104 may include types 108 that are explicitly defined and implicitly inherited. The project code 104 includes relationships 108 that are explicitly defined and implicitly inherited. FIG. 1 is merely an example to illustrate the systems and techniques. It should be understood that in practice, the development system 102 may include multiple project code being developed and each project code, such as the representative project code 104, may include tens or even hundreds of calls to components in third-party libraries. The development system 102 may include other project code 140 and corresponding other project binaries 142.

A compiler 110 may be used to compile the project code 104 to create a project binary 112. The project binary 112 may be an intermediate code (e.g., byte code) that is interpreted by a virtual machine, machine level code, or any combination thereof. The project binary 112 may implement at least one project function 114 to provide a particular type of functionality. The development system 102 may include other project code 128 and other project binaries 130 that are compiled versions of the other project code 128. The project code 104 may include dependencies 107 that identify portions of the other project code 128 that depends on (e.g., is called by or calls) the project code 128. The project binary 112 includes the dependencies 107, with portions of the other project binaries 130 depending on (e.g., called by or calling) the project binary 112. The compiler 110 may be used to compile the other project code 140 to create the other project binaries 142.

The orchestrator 145 performs an automated down port of at least a portion of the fix commit 152 done in a newer release, component 144(N) by open-source project maintainers. The portion of the fix commit 152 that addresses the vulnerability 150 is down ported, e.g., ported to an older, unsupported release, such as component 144(M), where component 144(N) is a newer version while component 144(M) is an older version. In some cases, the component 144(M) may be unsupported (e.g., end-of-life) and not receiving any further updates by the project maintainers. To create the patched component 172 in an isolated environment, the orchestrator 145 may submit a pull request 158 (or similar command) to the developer platform 118. While a pull request is specific to GitHub, another command having a similar effect to the pull request may be used with other platforms.

The orchestrator 145 (or the AI 147) may determine a smallest possible code change in the fix commit 152 that addresses the vulnerability 152 and port it back to the older version, component 144(M). The orchestrator 145 clones the repository (one of the third-party libraries 116) that existed for the version of the component (component 144(M)) to which the fix for the vulnerability 150 is being down ported. For example, the fix commit 152 may include code changes 154 and the orchestrator 145 (or the AI 147) may identify a subset 156 of the code changes 154 that address the vulnerability 150. The orchestrator 145 uses the subset 156 to create a patch 170 and applies the patch 170 to the component 144(M) to create a patched component 172. The orchestrator 145 validates the patch 170 by confirming (1) that the component 144(M) (the vulnerability 150 can be exploited by an attacker) and (2) that the patched component 172 is not vulnerable. The orchestrator 145 performs an upload 166 of the patched component 172, a build file 160, and build options 162 to a server associated with the software tools server 117. The build file 160 includes enough information to enable a client of the software tools provider to reproducibly build the patched component 172.

A patch scheduler 174 is a component that identifies vulnerabilities (such as the vulnerability 150) in open-source components and determines which ones are candidates for addressing using a down port. The criteria for determining which vulnerabilities are candidates for addressing may include (i) whether the vulnerability has been addressed in a later (newer) version of a particular component, (ii) how many software projects use the component (e.g., popularity), (iii) a severity of the vulnerability (e.g., does an exploit cause minimal or catastrophic results, is a workaround available), and so on. Assume the patch scheduler 174 determines that the vulnerability 150 in component 144(M) is a candidate to be addressed via a down port. The orchestrator 145 creates the pull request for component 144(M) (e.g., version M of component 144). Automated workflows operate on the pull request to down port the fix commit 152. The pull request 158 causes a branch 168 to be created. Creating the branch 168 enables developers to work independently on creating the patch 170, without affecting the main codebase and enabling parallel development.

The orchestrator 145 and a configuration file 163 may be temporarily installed on the developer platform 118 and executed (by the developer platform 118) to automate the process of creating the patch 170. The actions to create the patch happen in the branch 168 to avoid affecting other developers. In some cases, after the patch 170 has been successfully created, the branch 168 may be merged into the third party library 116. The orchestrator 145 downloads from the repository (third party libraries 116) the version (component 144(M)) that is to be fixed and determines whether the project (down port of fix commit 152) can be built. In some cases, for example, because the component 144(M) is very old or due to other incompatibility issues, the project may not be buildable. The orchestrator 145 may determine whether the project (down port of fix commit 152) uses a special configuration and if so, may modify the configuration file 163 accordingly. The orchestrator 145 may runs tests, determine a fix (e.g., the fix commit 152) that code maintainers made to a newer version (e.g., component 144(N)), examine the code changes 154 made by the fix commit 152, determine a subset 156 of the code changes 154 that address the vulnerability 150 in component 144(M), and apply the subset 156 of the code changes 154 to the old repository. The subset 156 is the smallest (minimal) amount of changes made to the component 144(M) to address the vulnerability 150. For example, the subset 156 may be identified by using static call graph analysis (by stitching together the partial call graphs 148) to isolate code changes that address the vulnerability 150. To illustrate, the fix commit 152 may address two (or more) issues. For example, the fix commit 152 may (1) address the vulnerability 150 and (2) address a second vulnerability that was introduced in a version after component 144(M) (e.g., component 144(M+1)). Because the second vulnerability is absent from the component 144(M), the AI 147 may determine the subset 156 (portion) of the code changes 154 associated with the fix commit 152 that address the vulnerability 150 and use the subset 156 to create the patch 170.

The orchestrator 145 may build (using build file 160 and options 162), compile, and test the patched component 172 to determine whether the patch 170 addresses the vulnerability 150 without introducing any breaking changes. For example, the orchestrator 145 may perform change impact analysis (CIA) to determine whether or not the patch 170 introduces a breaking change. The orchestrator 145 may run the test cases 164 on the patched component 172 to verify that the functions provided by the component 144(M) are unaffected after applying the patch 170. If a function of the component 144(M) is modified by the patch 170 but not invoked by the test cases 164, the AI 147 may modify the test cases 164 or add a new test to check that all functions of the component 144(M) are working properly in the patched component 172. If the orchestrator 145 determines that patch 170 introduces a breaking change, then the AI 147 may modify the patch 170 or develop a new patch that addresses the vulnerability 150 without introducing any breaking changes.

In some cases, the orchestrator 145 may use Bazel, an open-source build tool used for the automation of building and testing software. Information 176 related to the creation of the patch 170 is recorded and logged so that a developer using the component 144(M) and/or the patched component 172 can determine what was done and can reproduce the patch and the patched component 172. The information 176 includes the files that are involved, code changes made to individual files, build options, configuration details, and so on, thereby enabling code developers to make the same changes locally. In this way, the entire process to build the patched component 172 is reproducible. Reproducible means that the process is guaranteed to produce the same result (the patched component 172). A reproducible build is a set of software development practices that creates an independently verifiable path from source code to binary code. A build is reproducible if given the same source code, build environment and build instructions, anyone can recreate a bit-by-bit identical copy of the specified artifact. Thus, the orchestrator 145 runs tests, looks at fix commits in later releases, finds a subset of the code in the fix commits to apply to an older version, applies the subset of code to the older version, builds and tests the modified older version, and checks for breaking changes.

The orchestrator 145 may add intermediary files (created by the orchestrator 145) to the pull request branch 168 and include the files in the patch 170. During the process of creating, validating, and testing the patch 170, if anything breaks, e.g., the project can't be built, a test doesn't pass, a commit cannot be applied, or the like, then the AI 147 (or in some cases a human) may review and change (i) the configuration file 163, (ii) build options 162, or both to resolve the issue to enable the patch 170 to be created, validated, and tested. After the changes to the configuration file 163 and/or build options 162 have been made, the entire process, starting with the pull request 158, starts all over again. Thus, the configuration file 163 and/or build options 162 may be repeatedly modified until the patch 170 can be built, validated, and tested.

After the patch 170 has been identified, applied to the component 144(M), and found to fix the vulnerability 150, without introducing any breaking changes. The patched component 172 is validated. During validation, the orchestrator 145 runs a payload, such as test cases 164 that trigger the vulnerability 150 in the component 144(M), and review test results 166(1) to determine that the vulnerability 150 is present and can be exploited. The orchestrator 145 runs the payload, such as TC 164(1), on the patched component 172 and reviews test results 166(2) to determine that the vulnerability 150 has been addressed and cannot be exploited. Validation passes if the vulnerability was triggered in the test results 166(1) associated with the component 144(M) but not triggered after the patch 170 was created and applied to create the patched component 172.

The test cases 164 and test results 166 may be used by the orchestrator 145 to determine that the patch 170 does not introduce any breaking changes. For example, the orchestrator 145 or the AI 147 may examine a call graph of the component 144(M) and a call graph of the patched component 172 to determine whether the functions of the component work as intended. After the orchestrator 145 validates the patch 170 and determines that the patch 170 does not introduce any breaking changes, the pull request 158 may be merged and the binary that is created published. The patched component 172 (build artifact) is uploaded 166 to the software tools server 117. The software tools server 117 includes the database 122 (registry) with executables (binaries) that clients can use.

Thus, an automated process may identify a software component that has a vulnerability in an older version that has been addressed by a fix in a new version and down port the fix from the new version to the older version. The process may identify a subset of the code in a fix commit for the later version that addresses the vulnerability and create a patch. The process may apply the patch to the older version to create a patched component and validate the patched component by determining that the vulnerability cannot be exploited in the patched component. The validation process may include (1) running test cases on the older version of the component with the vulnerability, (2) running the test cases on the patched component, and (3) comparing the test results. The process may verify that the patch does not introduce breaking changes. For example, the process may compare static call graphs of (1) the older version of the component with the vulnerability and (2) the patched component to verify that the remaining code (excluding the vulnerability) functions as it did before the patch was applied. The build file, build options, configuration files, the patch, and the patched component, along with instructions on how to execute the orchestrator to create the patch and/or the patched component may be uploaded to a software tools provider's server to enable software developers to reproducibly build the patch. In this way, unsupported older versions of a component (including end-of-life components) can be patched to address vulnerabilities.

Figure 2:
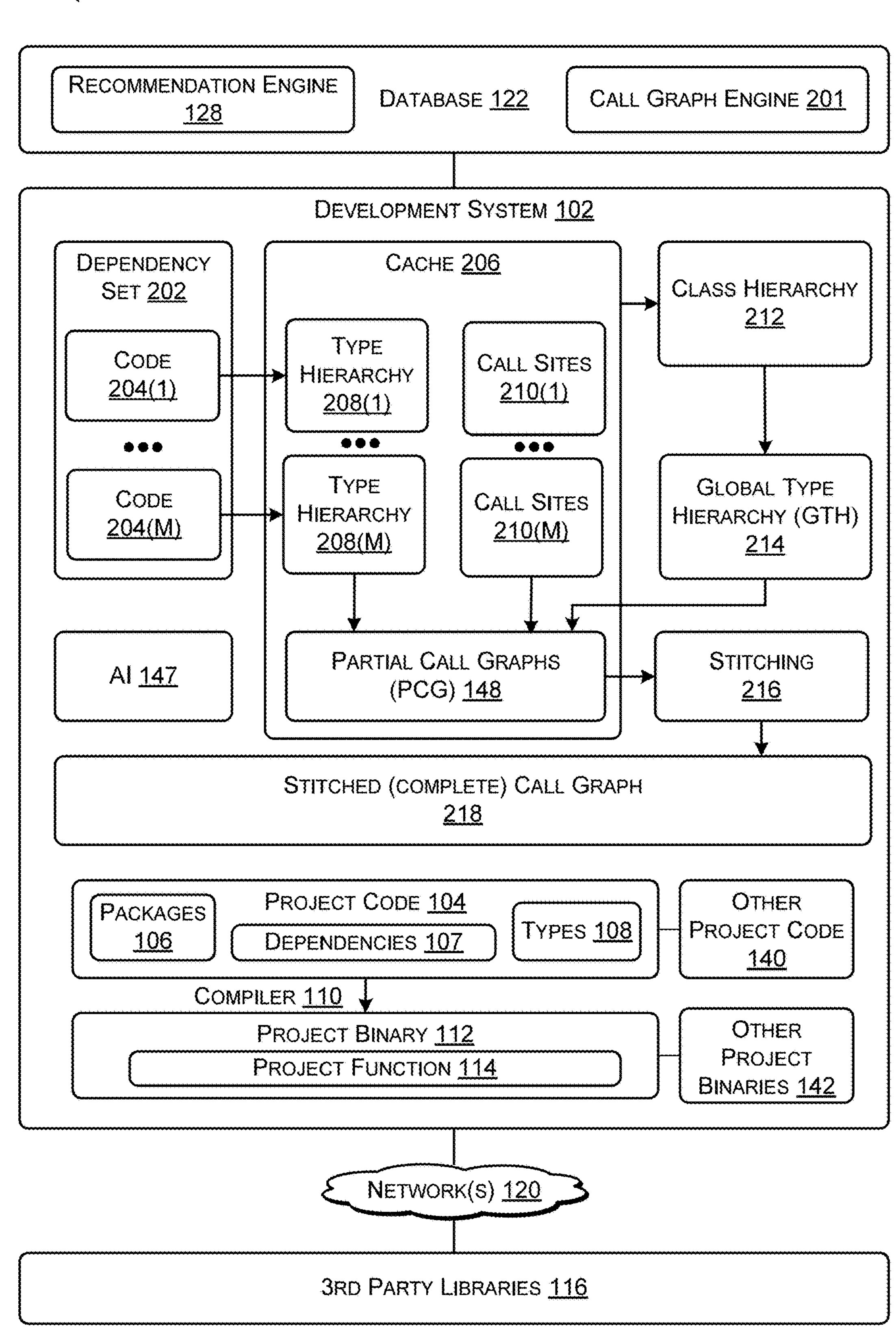
FIG. 2 illustrates a system to stitch together multiple partial call graphs, according to some embodiments.

FIG. 2 illustrates a system 200 to stitch together multiple call graphs, according to some embodiments. The system 200 illustrates additional components of the development system 102 of FIG. 1 used to create call graphs.

The call graph engine 201 may determine a dependency set 202 associated with the project code 104 that includes code 204(1) to code 204(M) (M>0). For example, for Java code, the code 204 may be in the form of Java archive (.jar) files. The call graph engine 201 may use a cache 206 to store partial call graphs associated with the project code 104. For example, the code 204(1) may have an associated type hierarchy 208(1) and associated call sites 210(1) and the code 204(M) may have an associated type hierarchy 208(M) and associated call sites 210(M). Based on the cache 206, the call graph engine 201 may create a class hierarchy 212 and determine a global type hierarchy 214. Based on the type hierarchy 208 and the call sites 210, the call graph engine 201 may create partial call graphs 148. The partial call graphs 148 may be fed into a stitching algorithm 216 that stitches the partial call graphs 148 to create a stitched call graph 218 (also referred to as simply a "call graph").

FIG. 2 illustrates a system in which the call graph engine 201 constructs a stitched CG 218 using a Class-Hierarchy Analysis (CHA) of the project code 104 by expanding invocation targets found in the bytecode. The call graph engine 201 does this by adding links to all overriding methods within the matching subtypes that override the original targets. The system 200 enables scalable CG generation for program code to enable fast analysis of the code, even in resource-limited environments. The system 200 may determine partial call graphs 148 and then stitch them together to generate the stitched call graph 218.

The call graph engine 201 resolves dependencies 107 in the project code 104 to generate the complete dependency set 202. For each of the dependencies 107, the call graph engine 201 requests a partial analysis result from the partial call graphs 148 in the cache 206 if available, or creates the partial analysis result if it does not exist in the cache 206. The partial analysis result includes (1) the partial call graph(s) 148 associated with the isolated dependency, including static Call Sites (CSs) 210 found in the bytecode and (2) the type hierarchy 208 including all types, their parent type, and the associated components that are declared in each dependency.

The call graph engine 201 builds a global type hierarchy (GTH) 214 and merges the individual type information from the type hierarchies 208 of the partial analysis results. The call graph engine 201 creates a class hierarchy 212. The call graph engine 201 creates the stitched call graph 218 by stitching 216 the partial call graphs 148. Constructing the stitched call graph is a complex task and is described in more detail below.

To generate the stitched call graph 218 for the project code 104, the call graph engine 201 determines the dependency set 202 for the project code 104 by performing dependency resolution (e.g., resolving all dependencies 107). Note that dependency resolution may not always be deterministic. For example, a new release of a dependency, either a direct dependency or a transitive dependency, may alter the dependency resolution result from the perspective of a particular package. Although the set of available packages may remain stable, the dependency resolution results can vary depending on different contexts. For example, a client application P may have direct dependencies on two versioned packages, A and B, both of which transitively rely on a library L. However, each of these versioned packages may use a different version of L (e.g., package A uses L V1 and package B uses L V2), leading to a resolution conflict. To resolve this conflict, a breadth-first search algorithm may be used to select the version of L that is "closest" in the dependency tree of client application P. This is because having two versions of the same package in a dependency set simultaneously is not possible. Therefore, the closest version strategy prioritizes the most relied-upon version. Thus, depending on whether P depends on A or not, the resolved dependency set 202 might differ when viewed from the perspective of B. Overall, there are two issues that make it difficult to simply generate a CG for an application and its dependencies. First, the use of a specific dependency version may be contextual. Secondly, the merging of partial results is not straightforward and may involve a significant amount of interaction between the partial results, which may vary based on the chosen dependency versions. For illustration purposes, FIGS. 3, 4, 5 provide examples of a dependency set, partial call graphs, and a global type hierarchy.

Figure 3:
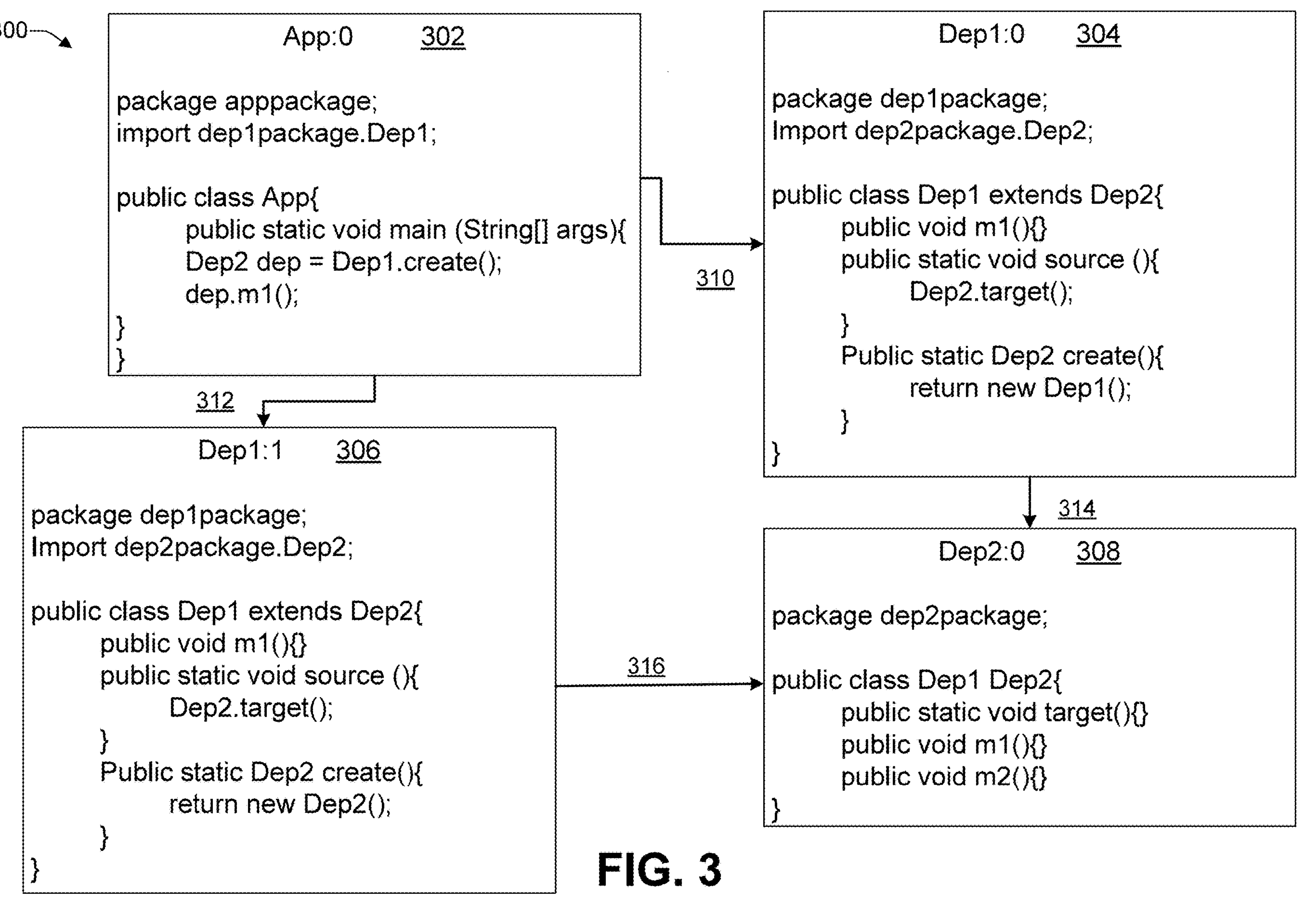
FIG. 3 illustrates an example of a dependency set, according to some embodiments.
Figure 4:
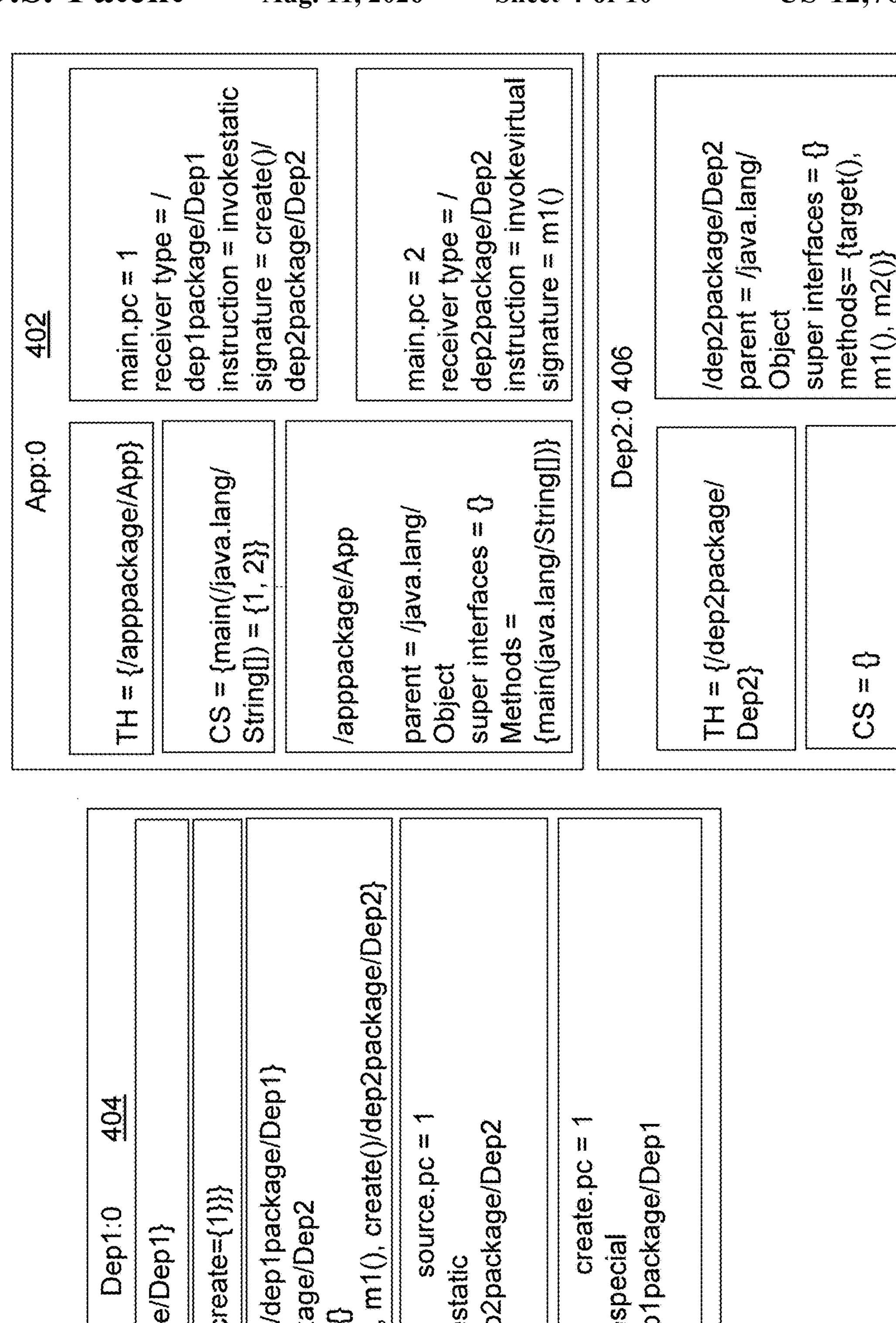
FIG. 4 illustrates partial call graphs of example versioned packages, according to some embodiments.

FIG. 3 illustrates an example 300 of a dependency set (such as the dependency set 202 of FIG. 2), according to some embodiments. FIG. 3 illustrates an example of a dependency set and interactions among versioned packages. For example, 302, 403, 306, 308 may be Java archive (jar) files or similar files used in another programming language. A JAR (Java Archive) file is a package file format used to aggregate multiple Java class files and associated metadata and resources (such as text, images, etc.) into one file. This format is commonly used to distribute application software or libraries on the Java platform. Of course a JAR files is used purely as an example and another type of similar archive file may be used for another programming language.

Application (program code) App:0 302 depends on Dep1:0 304 and Dept 1:1 306.

Dep1:0 304 depends on Dep2:0 308.

Dep1:1 306 depends on Dep2:0 308.

The dependency set illustrated in FIG. 3 includes three versioned packages 304, 306, 308, with dependency relations depicted by arrows 310, 312, 314, 316. As illustrated, version 0 (Dep1:0 304) of Dep1 and version 1 (Dep1:1 306) of Dep1 each depend on Dep2 (Dep2:0 308). A time sensitive dependency resolution is illustrated in this example, where App:0 302 specifies a version range dependency on com.example:dep1:[0, 1]. This results in a time-sensitive dependency resolution for App:0 302. For example, if the resolution is performed at time t1 when the latest released version of Dep1 is 0, then Dep1:0 304 is included in the dependency set. If the resolution is done at time t2, after version 1 of Dep1 (306) has also been released, then the result includes version 1 (306). This time-sensitive dependency resolution highlights contextuality.

Another issue occurs at a more granular level, where Dep1 invokes the target( ) from Dep2:0 308. In a more complex scenario, Dep1 may extend Dep2 and override m1( ). In the class App, the object dep is used to call m1( ). Depending on the specific type of variable dep, any overridden m1( ) from sub-classes of Dep2 could be invoked. The exact type of dep depends on the time of dependency resolution. For example, if the dependency resolution occurs at t1, then we use dep1:0 and the implemented create( ) method in this version returns a Dep1 instance, resulting in a call to Dep1.m1( ) in the App class. However, at t2, when version 1 is used, an instance of Dep2 is returned, and thus the callee of this call would be Dep2.m1( ). In this example, the type Dep2 is used to declare the variable dep, which is referred to as the "receiver type". Determining the exact type of the receiver object is a challenging problem. The CHA algorithm generates a CG by including all potential edges from all subtypes, such as Dep2 and its subtypes, including Dep1. To generate a whole-program CG from partial results, the information that is fixed for a versioned package can be stored and enough context information about the versioned package is preserved to allow the partial results to be merged later in the process. For CG generation, this minimal information is the partial call graph (PCG) for the isolated dependency and its declared types and methods. For simplicity, this data is referred to as a PCG. Whenever a whole-program CG is to be generated, dependency resolution is performed and the resolved dependency set is subsequently use, as described herein.

A whole-program CG is generated by collecting the PCGs for all direct or transitive dependencies of the project being analyzed. The dependency set has been previously created and a basic in-memory key-value store is used to manage access to the individual results and to act as a cache (temporary storage area). The key of each PCG is a coordinate that may include a groupId, an artifactId, and a version, which uniquely identifies a package within the system. If a PCG has been previously determined and cached, it can be directly returned, thereby eliminating redundant processing. However, if the PCG is not available in the cache (because it has not yet been created), then the PCG is created and added to the cache for future use.

To create the PCGs, the binary (e.g., .jar file) of the dependency is downloaded. A static analyzer is used to build a CG for this isolated versioned package and is then transformed into a PCG. The static analyzer may consider that non-private classes, fields, and methods are accessible from outside, non-final classes are extendable and non-final methods are overridable. The static analyzer may enable rewriting of invoke dynamic instructions to make them easier to analyze. A PCG may include two different types of information: (i) a snapshot of the (incomplete) type hierarchy that is declared within the versioned package, including the declared methods, and (ii) information about call sites (CS) within the versioned package.

FIG. 4 illustrates simplified examples of partial call graphs (PCGs) for versioned packages in the example dependency set shown in FIG. 3 (resolved at time t1), according to some embodiments. FIG. 4 includes App:0 402, Dep1:0 404, and Dep2:0 406.

Type Hierarchy PCGs store a Type Hierarchy (TH) that is defined in a versioned package. The systems and techniques use a naming convention (similar to Java bytecode) to identify types. For example, the type App in the Java package apppackage may be referred to as/apppackage/App. The systems and techniques differentiate between types that have been declared inside the current versioned package (internal) and those in dependencies (external). For every stored type, the systems and techniques preserve the list of declared components. As Java supports virtual components, this may be used to infer override relations. The systems and techniques store the method signatures and preserve their name, list of parameters (including types), and the return type. For example, the signature of the well-known equals method Object.equals (Object) may be stored as equals (/java.lang/Object)/java.lang/BooleanType. The data model used by the systems and techniques allows for the storage of arbitrary metadata as key-value pairs to enable future use cases. For example, the data model may be used to mark abstract components (referred to as methods in Java) without implementation.

Information obtained to later create a CG includes a list of Call Sites (CS) identified in the partial call graph (PCG). A CS is an instruction in the bytecode that results in a component (e.g., method) call. For each CS, the systems and techniques identify the source (surrounding) component and the target component that is being called and store this pair as one call relation. For each call relation, the bytecode instruction type is stored, e.g., static invocation. As FIG. 4 illustrates, CSs of each source component are indexed by their program counter (PC). Since PC is unique for each invocation site, the PC may be used as a key. While this approach is helpful for tracing the results, any type of unique key may be used as an index for each CS. For example, in the case of the App class, there are two CS in the main component. In the first one, dep is declared, and in the second one, dep is used to call method m1( ). The receiver type of the first CS is /dep1package/Dep1 and it is used to call the create( ) component. In the second CS, /dep2package/Dep2 is the receiver type because it is the type of the variable dep. The first call uses static invocation while the second one uses virtual invocation. For each CS, the systems and techniques may store the signature of the target component. In the previous example, the first call's signature is create( )/dep2package/Dep2 and the second one is m1( ). A CHA algorithm is used to build the PCGs. Static information, such as receiver type, invocation instruction, and target signature, which are available in the bytecode itself, may be used. The data model is simple, making it easy to add an efficient, binary disk serialization. Generating the PCGs is expensive so storing the PCGs in a cache across different analysis executions results in a reduction in computation time and memory usage. For example, build server integration may preserve partial results from build to build for a substantial speed-up. Alternatively or in addition, a central server may host an in-memory storage to store frequently used dependencies across multiple projects.

FIG. 5 illustrates an example 500 of a global type hierarchy (GTH) of example versioned packages, according to some embodiments. The GTH 214 of FIG. 2 may include three tables: a parents index 502, a defined methods (components) 504, and a children index 506. The parent index 502 includes a type column 508 and an ordered list of parents column 510. The defined methods (components) 504 includes a type column 512, a signature column 514, and a package (pkg) column 516. The children index 506 includes a children index type column 518, and a set of all children column 520.

The GTH 214 may be determined after determining the PCGs for the different packages in the resolved dependency set 202 of FIG. 2. The (incomplete) typing information of the individual versioned packages may be merged into a (complete) global type hierarchy 214. This creates a complete picture of the type-system that is used when executing the whole program, referred to as the Global Type Hierarchy (GTH) 214. Assuming that the dependency set 202 is complete, merging the individual type hierarchies 208 can be performed by joining the sets of internal types stored in the individual type hierarchies 208. For example, consider the example dependency set in FIG. 3 (resolved in t1). This set is $$DepSet = \{app{:}0,\ dep1{:}0,\ dep2{:}0\}$$

and therefore $$GTH = THapp{:}0 \cup T\,Hdep1{:}0 \cup T\,Hdep2{:}0.$$

Unresolved external types included in the type hierarchies 208 may appear as an internal type in one of the other versioned packages. For convenience and efficient traversal of type hierarchies 208, this information may be transformed into multiple index tables. These index tables 502, 504, 506 are shown in FIG. 5 for the versioned package examples of FIG. 3. Each type is indexed using its full name since this name is unique in the classpath of the program (otherwise it could not be compiled). Three different index tables 502, 504, 506 are created. The first table 502 stores the parents of each type based on the inheritance order. For example, because class /dep1package/Dep1 directly extends /dep2package/Dep2, therefore the first parent that appears in the parent list of /dep1package/Dep1 is /dep2package/Dep2. This sequence continues for each type until the/java.lang/Object class is reached. After the list of all parent classes, a set of all interfaces that a type or any of its parents' implement is appended. This is because Java gives precedence to classes. In addition, the order of super interfaces that are appended to the list of parents does not matter because there cannot be two interfaces with default implementations of the same signature in the parent list of a type.

The parent index table 502 may not be directly used during stitching. Instead, the parent index table 502 may be used to facilitate creating the children index 506 and defined methods (components) index 504. Another index that may be created is a list of all children of a particular type, the children index 506. Types that extend or implement a given type may be identified, including indirect relationships through inheritance. Indirect relationships occur when a type's ancestor extends/implements the given type, such as a grandparent. This set may not keep any order. The final index in the GTH 214 is the list of methods that each type defines or inherits, as shown in the defined methods index 504.

The signatures 514 in the defined methods (components) 504 may be used as an index to identify in which versioned package they are implemented. For example, if a method (component) is not implemented in a current type itself, then identify a first parent that implements it. The ordered list of parents in the parent index 502 may be used to efficiently retrieve this information. For example, as shown in FIG. 5 /dep1package/Dep1 inherits method m2( ) from its dependency dep2:0. Because /dep1package/Dep1 overrides m1( ), the index points to dep1:0 as the defining versioned package of this signature. After the PCGs 148 are ready and the global type hierarchy 214 has been established for the complete dependency set 202, the stitching 216 is performed. The stitching 216 connects the call sites 210 found in the bytecode with all potential method (component) implementations that can be reached by the corresponding invoke instruction.

In the flow diagrams of FIGS. 6, 7, 8, and 10 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. The processes 600, 700, 800, and 1000 are described with references to one or more of FIGS. 1, 2, 3, 4, and 5 above, but it should be understood that they may be implemented using various other models, frameworks, systems and environments.

Figure 6:
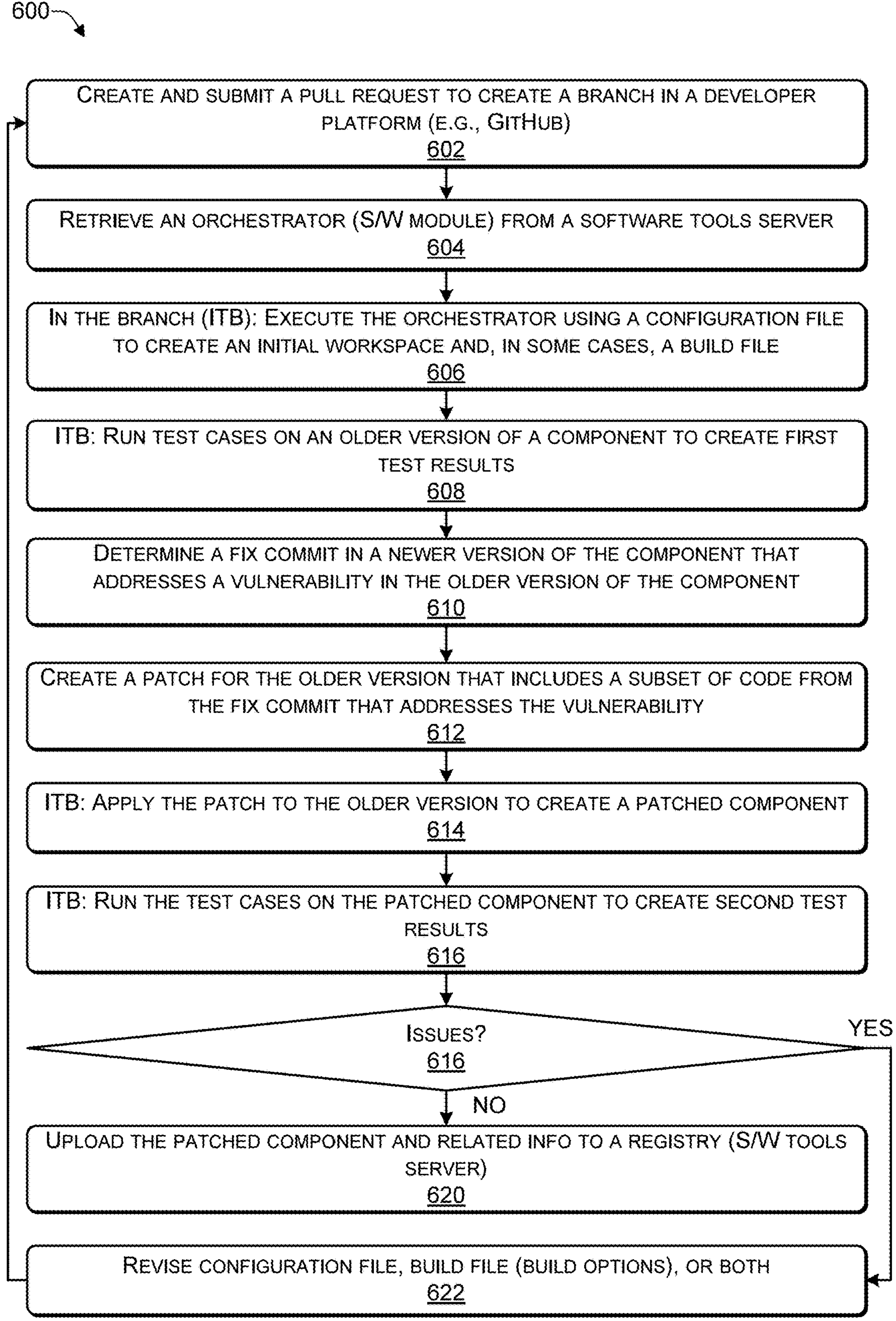
FIG. 6 is a process to reproducibly build, test, and validate a patched artifact (component), according to some embodiments.

FIG. 6 is a process 600 to reproducibly build, test, and validate a patched artifact (component), according to some embodiments. The process 600 may be performed by one or more components hosted by the software tools server 117, such as the orchestrator 145, the AI 147, the patch scheduler 174, or any combination thereof.

At 602, the process may create and submit a pull request to create a branch in the developer platform (e.g., GitHub). At 604, the process may retrieve an orchestrator (software component) from a software tools server. For example, in FIG. 1, the patch scheduler 174 may submit the pull request 158 to the developer platform 118 to create the branch 168 and cause the orchestrator 145 to be retrieved from the software tools server 117 and placed on the developer platform 118.

At 606, in the branch, the orchestrator is executed using a configuration file to create an initial workspace and, in some cases, a build file. At 608, in the branch, test cases are run on an older version of the component to create first test results. For example, in FIG. 1, the orchestrator 145 creates an initial workspace in the branch 168. The orchestrator 145 may run the test cases 164 on the component 144(M) to create the test results 166(1).

At 610, the process may determine a fix commit in a newer version of the component that addresses a vulnerability in the older version of the component. At 612, the process may create a patch for the older version that includes a subset of code from the fix commit that addresses the vulnerability. For example, in FIG. 1, the orchestrator 145 or the AI 147 may identify the fix commit 152 in the component 144(N) that addresses the vulnerability 150. The orchestrator 145 or the AI 147 may create the patch 170 for the component 144(M) based on the subset 156 of the code changes 154 associated with the fix commit 152, where the subset 156 addresses the vulnerability 150.

At 614, in the branch, the patch may be applied to the older version to create a patched component. At 616, in the branch, the test cases may be run on the patched component to create second test results. At 616, the process may determine (based on the second test results) whether any issues occurred. If the process determines, at 616 that no issues were found, then the process, at 620, uploads the patched component and related information to a registry (and/or the software tools server). If the process determines that one or more issues occurred, then the process may revise the configuration file the build file (including build options), or both and proceed back to 602 and create and submit a new pull request to create a branch in the developer platform using the revised configuration file and/or build file. For example, in the branch 168, the orchestrator 145 may apply the patch to the older version (component 144 (M)) to create the patched component 172. In the branch 168, the orchestrator 145 may run the test cases on the patched component 172 to create second test results 166(2). The orchestrator 145 may compare the test results 166(1) with the test results 166(2) to validate that the patch 170 addresses the vulnerability 150 without introducing any issues, such as breaking changes. If the orchestrator 145 determines, based on the comparison of test results 166(1) with test results 166(2), that no issues (e.g., no breaking changes) were found, then the orchestrator 145 may upload the patched component 172, the patch 170, the configuration file 163, the build file 160, or any combination thereof to a registry and/or the software tools server 117. If the orchestrator 145 determines that one or more issues occurred during the build and/or test of the patch 170, then the orchestrator 145 may revise the configuration file 163, the build file 160 (including build options 162), or both and start the process again by submitting another pull request 158 to create the branch 168 in the developer platform 118 using the revised configuration file 163 and/or build file 160.

Thus, an automated process may identify a software component that has a vulnerability in an older version that has been addressed by a fix in a newer version and down port the fix from the new version to the older version. The process may identify a subset of the code in a fix commit for the later version that addresses the vulnerability and create a patch. The process may apply the patch to the older version to create a patched component and validate the patched component by determining that the vulnerability cannot be exploited in the patched component. The validation process may include (1) running test cases on the older version of the component with the vulnerability, (2) running the test cases on the patched component, and (3) comparing the test results to determine that the patch addresses the vulnerability. The process may verify that the patch does not introduce issues, such as breaking changes, and thus retains the functionality of the original (older version of the) component. For example, the process may compare static call graphs of (1) the older version of the component with the vulnerability and (2) the patched component to verify that the remaining code (excluding the vulnerability) functions as it did before the patch was applied. The build file, build options, configuration files, the patch, and the patched component, along with instructions on how to execute the orchestrator to create the patch and/or the patched component may be uploaded to a software tools provider's server to enable software developers to reproducibly build the patch. In this way, unsupported older versions of a component (including end-of-life components) can be patched to address vulnerabilities and prevent the vulnerabilities from being exploited by an attacker.

Figure 7:
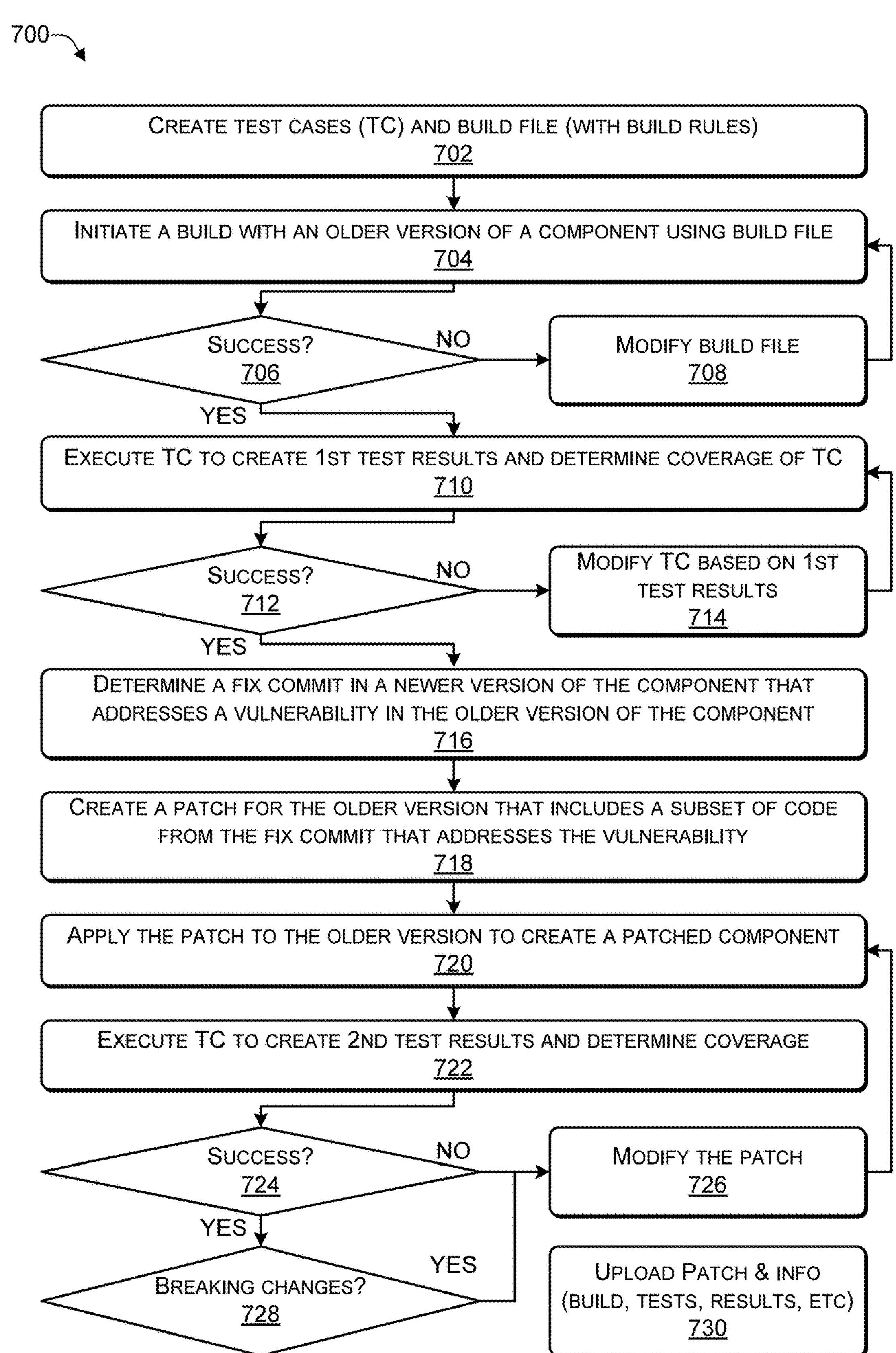
FIG. 7 is a process to back propagate a patch based on a subset of code from a fix commit in a newer version of a component, according to some embodiments.

FIG. 7 is a process 700 to back propagate a patch based on a subset of code from a fix commit in a newer version of a component, according to some embodiments. The process 600 may be performed by one or more components hosted by the software tools provider server 117, such as the orchestrator 145, the AI 147, the patch scheduler 174, or any combination thereof.

At 702, the process may create one or more test cases (TC) and create a build file with build rules. At 704, the process may initiate a build with an older version of a component using the build rules. At 706, the process determines whether the build is a success. If, at 706, the process determines that the build is a success, then the process proceeds to 710. If, at 706, the process determines that the build was unsuccessful, then, the build rules may be modified, at 708, and the process may proceed back to 704 to perform a build using the modified build rules. For example, in FIG. 1, the orchestrator 145 may create the test cases 164 and the build file 160 that includes build rules (rules regarding how the automated build process is to proceed) and build options 162. The orchestrator 145 initiates a build using the component 144(M), an older version of component 144, using the build file 160. The orchestrator 145 determines whether the build is a success. If the orchestrator 145 determines that the build is a success, then the orchestrator 145 executes the text cases 164 to create the test results 166(1). If the orchestrator 145 determines that the build failed (was unsuccessful and could not be completed), then, the orchestrator 145 may modify the build rules in the build file 160, modify the build options 162, or take other actions to address the failure to complete the build. The orchestrator 145 may initiate a new build using the modified build rules.

At 710, the process executes test cases (TC) to create 1st test results and determines a coverage of the test cases. The process determines, at 712, whether the coverage of the test cases was successful (e.g., did the test cases cover all the functions of the component, including exploiting the vulnerability). If, at 712, the process determines that the coverage of the test cases was successful, then the process proceeds to 716. If, at 712, the process determines that the coverage of the test cases was unsuccessful (e.g., not all functions of the component were tested, the vulnerability was not exploited, or both), then, at 714, the test cases may be modified based on the 1st test results, and the process may proceed to 710 to execute the modified tests. For example, in FIG. 1, the orchestrator 145 executes the test cases 164 to create the test results 166(1) (first test results) and determines a coverage of the test cases 164. For example, the coverage may be determined by examining the test results 166(1) and/or a call graph created by stitching together the partial call graphs 148. The orchestrator 145 determines (based on the call graph analysis and/or the test results 166(1)) whether the coverage of the test cases 164 was successful (e.g., did the test cases cover all the functions of the component 144(M), including exploiting the vulnerability 150). If the orchestrator 145 determines that the coverage of the test cases 164 was successful (the test cases covered all the functions of the component 144(M) and exploited the vulnerability 150), then the orchestrator 145 may proceed with creating a patch for the vulnerability 150. If the orchestrator 145 determines that the coverage of the test cases 164 was unsuccessful (e.g., not all functions of the component 144(M) were tested, the vulnerability was not exploited, or both), then the orchestrator 145 may modify the test cases 164 based on the test results 166(1) and execute the modified cases 164. The orchestrator 145 may repeatedly review the rest results 166(1) and modify the test cases 164 until the test results 166(1) indicate the test cases 164 cover all the functions of the component 144(M) and exploit the vulnerability 150.

At 716, the process may determine a fix commit in a newer version of the component that addresses a vulnerability in the older version of the component. At 718, the process may create a patch for the older version that includes a subset of code from the fix commit that addresses the vulnerability. At 720, the process may apply the patch to the older version to create a patched component. For example, in FIG. 1, the orchestrator 145 may identify the fix commit 152 in component 144(N) (a newer version of the component 144) that addresses the vulnerability 150. The orchestrator 145 (or the AI 147) may create the patch 170 using the subset 156 of the of code changes 154 associated with the fix commit 152. For example, the subset 156 may be the minimum (smallest) amount of code from the fix commit 152 that addressed the vulnerability 150, without introducing any breaking changes. The orchestrator 145 may apply the patch 170 to the component 144(M) to create the patched component 172.

At 722, the process may execute the test cases to create 2nd test results and determine coverage of the test cases. The process may determine, at 724 whether the second test results indicated that the coverage was successful. If the process determines, at 724, that the coverage was unsuccessful (e.g., the component did not function correctly, the vulnerability was exploited, or both), then the process may modify the patch, at 726, and proceed to 722 apply the modified patch to the older version to create the patched component. If the process determines, at 724, that the coverage was successful e.g., the component functions correctly and the vulnerability could not be exploited, then the process determines, at 728, whether the patch introduces breaking changes. If the process determines, at 728, that the patch introduces breaking changes, then the process modifies the patch, at 726, and proceeds to 722 apply the modified patch to the older version to create a patched component. If the process determines, at 728, that the patch does not introduce any breaking changes, then the process uploads the patched component and related information, such as the patch, the build file, the configuration file, the test cases, the two sets of test results, the test cases coverage, or any combination thereof to a registry (and/or the software tools server). For example, in FIG. 1, the orchestrator 145 may execute the test cases 164 on the patched component 172 to create test results 166(2) (second test results) and determine the coverage of the test cases 164, based on the test results 166(2) (and in some cases, based on analyzing a call graph stitched together from the partial call graphs 148). The orchestrator 145 determines whether the test results 166(2) indicate that the coverage was successful (e.g., did the component function correctly and was the vulnerability not exploited). If the orchestrator 145 determines that the coverage was unsuccessful (e.g., the patched component 172 did not function correctly, the vulnerability 150 was exploited in the patched component 172, or both), then the orchestrator 145 may modify the patch 170, apply the modified patch to the component 144(M) (older version) to create the patched component 170 and re-execute the test cases 164. The orchestrator 145 may repeat the process of patching the component, running the test cases, and modifying the patch until the patched component 172 performs the functions it is designed to perform (the patch does not introduce any breaking changes) and the vulnerability cannot be exploited. If the orchestrator 145 determines that the coverage of the test cases 164 was successful, e.g., the component functions correctly and the vulnerability could not be exploited, then the orchestrator 145 determines whether the patch 170 introduces any breaking changes (causing the patched component 172 to function in a way that the developer did not intend). If the orchestrator 145 determines that the patch 170 introduces breaking changes, then the orchestrator 145 modifies the patch 170 and applies the modified patch to the older version (component 144(M)) to create a patched component. The patch may be repeatedly modified until the orchestrator 145 determines that the patch 170 does not cause any breaking changes. If the orchestrator 145 determines that the patch 170 does not introduce any breaking changes, then the orchestrator 145 performs the upload 166 of the patched component 172 and related information 176, such as the patch 170, build file 160, the configuration file 163, the test cases 164, the two sets of test results 166(1), 166(2), the test case coverage, or any combination thereof to the software tools server 117.

Thus, an automated process may identify a software component that has a vulnerability in an older version, where the vulnerability has been addressed by a fix in a newer version. The process may down port at least a portion of the fix from the new version to the older version. For example, the process may identify a subset of the code in a fix commit for the later version that addresses the vulnerability and create a patch. The process may apply the patch to the older version to create a patched component and validate the patched component by determining that the vulnerability cannot be exploited in the patched component. The validation process may include (1) running test cases on the older version of the component with the vulnerability, (2) running the test cases on the patched component, and (3) comparing the test results. The process may verify that the patch does not introduce breaking changes. For example, the process may compare static call graphs of (1) the older version of the component with the vulnerability and (2) the patched component to verify that the remaining code (excluding the vulnerability) functions as it did before the patch was applied. The build file, build options, configuration files, the patch, and the patched component, along with instructions on how to execute the orchestrator to create the patch and/or the patched component may be uploaded to a software tools provider's server to enable software developers to reproducibly build the patch. In this way, unsupported older versions of a component (including end-of-life components) can be patched to address vulnerabilities.

FIG. 8 is a process that includes stitching (merging) partial graphs, according to some embodiments. The process may be performed by the call graph engine 201 of FIG. 2.

At 802, the process resolves individual dependencies (both direct and transitive) in a program. At 804, the process generates a partial call graph (PCG) for individual (isolated) dependencies. At 806, the process stores (in a cache) type hierarchies defined in the individual dependencies. At 808, the process caches pre-computer partial call graphs across multiple builds. Thus, the partial call graphs are computed once per dependency and then reused when a particular dependency (associated with the partial call graph) is identified. At 810, the process stitches the partial call graphs together to create a complete call graph of the program.

For example, in FIG. 2, the call graph engine 201 resolves individual dependencies (both direct and transitive) of the project code 104 to create the dependency set 202. The call graph engine 201 generates the partial call graphs (PCG) 148 for individual (isolated) dependencies in the set of dependencies 202. The call graph engine 201 stores (in the call graph cache) type hierarchies defined in the individual dependencies. At 808, the call graph engine 201 caches pre-computer partial call graphs across multiple builds. Thus, the partial call graphs 148 are computed once per dependency and then reused when a particular dependency is identified. At 810, the call graph engine 201 stitches the partial call graphs 148 together to create the stitched (complete) call graph 218 of the project code 104.

Figure 9:
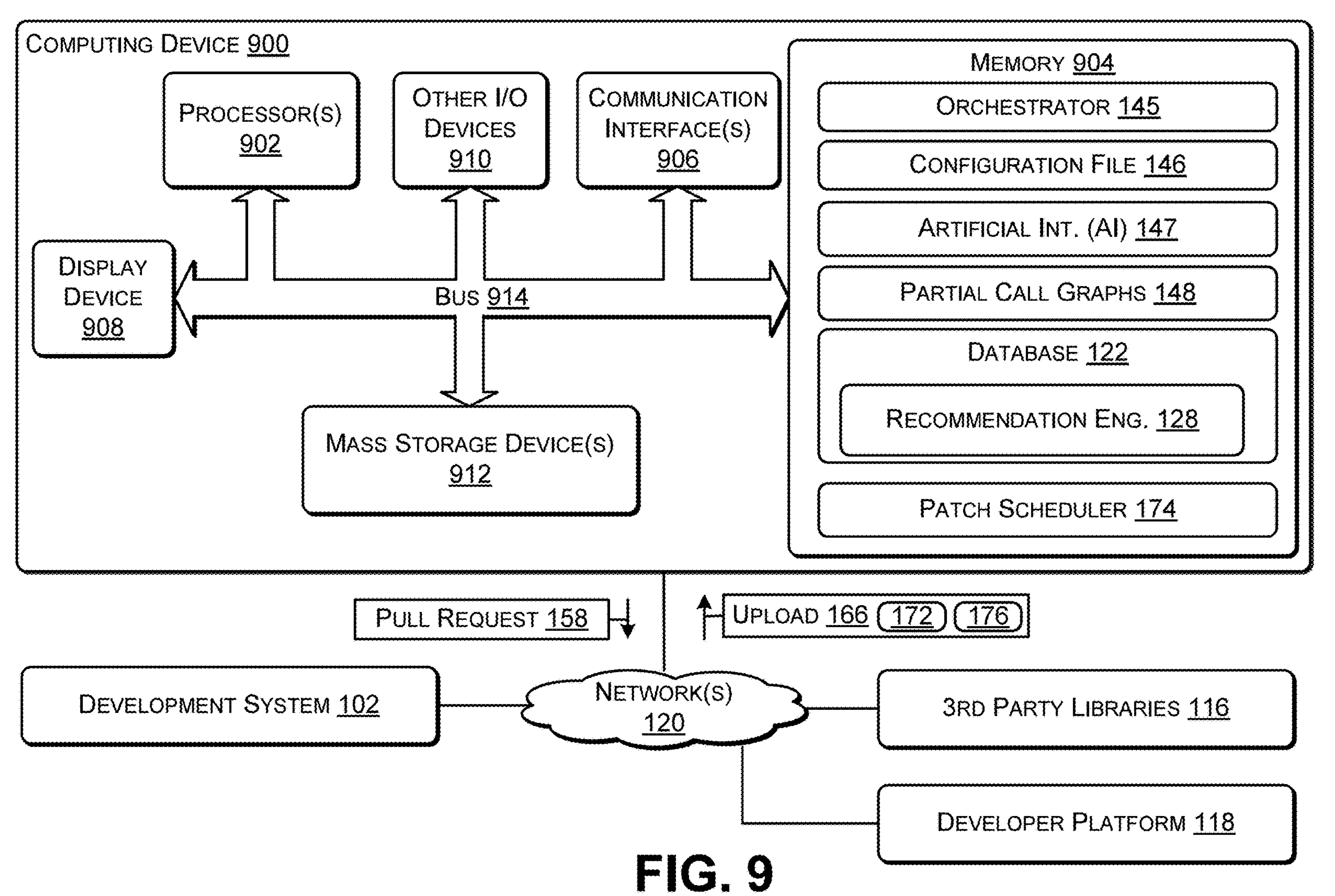
FIG. 9 is a block diagram of a computing device that can be used to implement the systems and techniques described herein.

FIG. 9 illustrates an example configuration of a computing device that can be used to implement the systems and techniques described herein, such as hosting the software tools provider server 117 of FIG. 1 or being used to train the AI 147. The computing device 900 may include one or more processors 902 (e.g., central processing unit (CPU), graphics processing unit (GPU), AI processing units (AIPU), or any combination thereof), a memory 904, communication interfaces 906, a display device 908, other input/output (I/O) devices 910 (e.g., keyboard, trackball, and the like), and one or more mass storage devices 912 (e.g., disk drive, solid state disk drive, or the like), configured to communicate with each other, such as via one or more system buses 914 or other suitable connections. While a single system bus 914 is illustrated for ease of understanding, it should be understood that the system buses 914 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), High-Definition Multimedia Interface (HDMI), and the like), power buses, etc.

The processors 902 are one or more hardware devices that may include a single processing unit or a number of processing units, all of which may include single or multiple computing units or multiple cores. The processors 902 may include a GPU and/or AIPU that is integrated into the CPU or the GPU and/or AIPU may be a separate processor device from the CPU. The processors 902 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 902 are configured to fetch and execute computer-readable instructions stored in the memory 904, mass storage devices 912, and other types of non-transitory computer-readable media.

Memory 904 and mass storage devices 912 are examples of non-transitory computer storage media (e.g., memory storage devices) for storing instructions that can be executed by the processors 902 to perform the various functions described herein. For example, memory 904 may include both volatile memory and non-volatile memory (e.g., RAM, ROM, or the like) devices. Further, mass storage devices 912 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 904 and mass storage devices 912 may be collectively referred to as memory or computer storage media herein and include any type of non-transitory media capable of storing computer-readable, processor-executable program instructions as computer program code that can be executed by the processors 902 as a particular machine configured for carrying out the operations and functions described in the implementations herein.

The computing device 900 may include one or more communication interfaces 906 for exchanging data via the network(s) 120. The communication interfaces 906 can facilitate communications within a wide variety of networks and protocol types, such as a representative network 120 that may include wired networks (e.g., Ethernet, DOCSIS, DSL, Fiber, USB etc.) and wireless networks (e.g., WLAN, GSM, CDMA, 802.11, Bluetooth®, Wireless USB, ZigBee®, cellular, satellite, etc.), the Internet and the like. Communication interfaces 906 can also provide communication with external storage, such as a storage array, network attached storage, storage area network, cloud storage, or the like.

The display device 908 may be used for displaying content (e.g., information and images) to users. Other I/O devices 910 may be devices that receive various inputs from a user and provide various outputs to the user, and may include a keyboard, a touchpad, a mouse, a printer, audio input/output devices, and so forth.

The computer storage media, such as memory 904 and mass storage devices 912, may be used to store software and data as shown in FIG. 9. For example, the memory 904 may be used to store the orchestrator 145, the configuration file 146, the AI 147, the partial call graphs 148, the database 122, and the patch scheduler 174. The computing device 900 may be connected to one or more third-party libraries 116, the development system 102, and the developer platform 118, via one or more networks 120.

Figure 10:
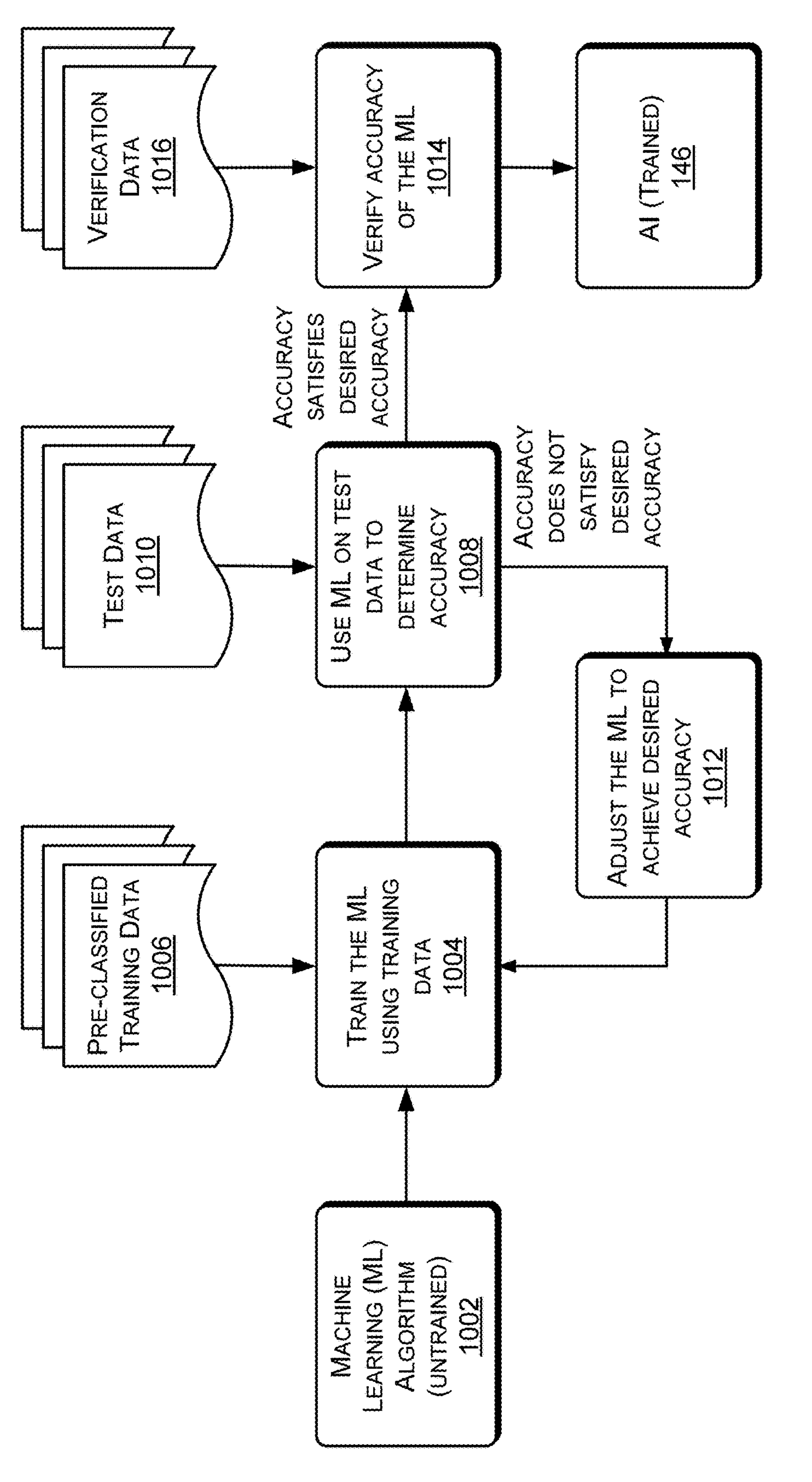
FIG. 10 is a process to train, test, and verify a machine learning algorithm to achieve a desired accuracy in identifying fix commits related to a vulnerability, according to some embodiments.

FIG. 10 is a flowchart of a process to train an artificial intelligence (AI) algorithm, according to some embodiments. For example, the process 1000 may be performed by the computing device 900 of FIG. 9 to create the AI 147.

At 1002, a machine learning algorithm (e.g., software code that has not yet been trained) may be created by one or more software designers. At 1004, the machine learning algorithm may be trained using pre-classified training data 1006 (e.g., a portion of the training data 112 that has been pre-classified). For example, the training data 1006 may have been pre-classified by humans, by machine learning, or a combination of both. After the machine learning has been trained using the pre-classified training data 1006, the machine learning may be tested, at 1008, using test data 1010 to determine an accuracy of the machine learning. For example, in the case of a classifier, the accuracy of the classification may be determined using the test data 1010.

If an accuracy of the machine learning does not satisfy a desired accuracy (e.g., 95%, 98%, 99% accurate), at 1008, then the machine learning code may be modified (e.g., adjusted), at 1012, to achieve the desired accuracy. For example, at 1012, the software designers may modify the machine learning software code to improve the accuracy of the machine learning algorithm. After the machine learning has been tuned, at 1012, the machine learning may be retrained, at 1004, using the pre-classified training data 1006. In this way, 1004, 1008, 1012 may be repeated until the machine learning is able to classify the test data 1010 with the desired accuracy.

After determining, at 1008, that an accuracy of the machine learning satisfies the desired accuracy, the process may proceed to 1014, where verification data 1016 may be used to verify an accuracy of the machine learning. After the accuracy of the machine learning is verified, at 1014, the result is the AI 147 of FIG. 1, which has been trained to perform at least a portion of the processes described herein.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:

determining, by one or more processors, that project code in a development system references an older version of a component in a third-party library;

determining, by the one or more processors, that a newer version of the component in the third-party library has a fix commit that addresses a vulnerability in the older version of the component;

determining, by the one or more processors, a subset of code changes associated with the fix commit that addresses the vulnerability in the older version of the component;

submitting, by the one or more processors and via a communication network, a pull request to create a branch in a developer platform;

creating, in the branch and by the one or more processors, a patch based on the subset of the code changes associated with the fix commit;

applying, in the branch and by the one or more processors, the patch to the older version of the component to create a patched component;

validating, in the branch and by the one or more processors, the patch;

after successfully validating the patch in the branch, uploading, by the one or more processors, the patched component and information associated with the patch to a registry to enable a software developer to download and use the patched component; and providing sufficient details in the information associated with the patch to enable the software developer to reproducibly build the patch.

2. The computer-implemented method of claim 1, wherein validating the patch by the one or more processors comprises: executing a set of test cases on a first build that includes the older version of the component to create first test results; determining that the first test results indicate that the set of test cases exploited the vulnerability in the older version of the component; executing the set of test cases on a second build that includes the patched component to create second test results; and determining that the second test results indicate that the set of test cases did not exploit the vulnerability in the patched component.

3. The computer-implemented method of claim 2, further comprising: initiating a process to create the first build using a build file comprising build rules and build options; based on the process to create the first build failing, modifying the build file to create a modified build file; and re-initiating the process to create the first build using the modified build file.

4. The computer-implemented method of claim 1, wherein validating the patch comprises: executing a set of test cases on a first build that includes the older version of the component to create first test results; determining that the first test results indicate that the set of test cases exploited the vulnerability in the older version of the component; executing the set of test cases on a second build that includes the patched component to create second test results; determining that the second test results indicate that the set of test cases exploited the vulnerability in the patched component; modifying the patch to create a modified patch; executing the set of test cases on a third build that includes the modified patch to create third test results; and determining that the third test results indicate that the set of test cases did not exploit the vulnerability in the modified patch.

5. The computer-implemented method of claim 1, further comprising: performing change impact analysis on the patched component; and determining, based on the change impact analysis, that the patched component does not introduce a breaking change.

6. The computer-implemented method of claim 1, wherein the information associated with the patch comprises: information identifying the older version of the component in the third-party library; information identifying the vulnerability; information identifying files used; information related to a build file; information related to build options; one or more configuration details; or any combination thereof.

7. The computer-implemented method of claim 1, further comprising: performing change impact analysis on the patched component; determining, based on the change impact analysis, that the patch introduces a breaking change; modifying the patch to create a modified patch; and performing the change impact analysis using the modified patch.

8. A server comprising:

one or more processors; and one or more non-transitory computer readable media storing instructions executable by the one or more processors to perform operations comprising:

determining that project code in a development system references an older version of a component in a third-party library;

determining that a newer version of the component in the third-party library has a fix commit that addresses a vulnerability in the older version of the component;

determining a subset of code changes associated with the fix commit that addresses the vulnerability in the older version of the component;

submitting, via a communication network, a pull request to create a branch in a developer platform;

creating, in the branch, a patch based on the subset of the code changes associated with the fix commit;

applying, in the branch, the patch to the older version of the component to create a patched component;

validating, in the branch, the patch;

after successfully validating the patch in the branch, uploading the patched component and information associated with the patch to a registry to enable a software developer to download and use the patched component; and providing sufficient details in the information associated with the patch to enable the software developer to reproducibly build the patch.

9. The server of claim 8, wherein validating the patch comprises: executing a set of test cases on a first build that includes the older version of the component to create first test results; determining that the first test results indicate that the set of test cases exploited the vulnerability in the older version of the component; executing the set of test cases on a second build that includes the patched component to create second test results; and determining that the second test results indicate that the set of test cases did not exploit the vulnerability in the patched component.

10. The server of claim 9, the operations further comprising: initiating a process to create the first build using a build file comprising build rules and build options; based on the process to create the first build failing, modifying the build file to create a modified build file; and re-initiating the process to create the first build using the modified build file.

11. The server of claim 8, the operations further comprising:

performing change impact analysis on the patched component; and determining, based on the change impact analysis, that the patched component does not introduce a breaking change.

12. The server of claim 8, wherein validating the patch comprises: executing a set of test cases on a first build that includes the older version of the component to create first test results; determining that the first test results indicate that the set of test cases exploited the vulnerability in the older version of the component; executing the set of test cases on a second build that includes the patched component to create second test results; determining that the second test results indicate that the set of test cases exploited the vulnerability in the patched component; modifying the patch to create a modified patch; executing the set of test cases on a third build that includes the modified patch to create third test results; and determining that the third test results indicate that the set of test cases did not exploit the vulnerability in the modified patch.

13. The server of claim 8, wherein the information associated with the patch comprises: information identifying the older version of the component in the third-party library; information identifying the vulnerability; information identifying files used; information related to a build file; information related to one or more build options; one or more configuration details; or any combination thereof.

14. The server of claim 8, the operations further comprising: performing change impact analysis on the patched component; determining, based on the change impact analysis, that the patch introduces a breaking change; modifying the patch to create a modified patch; and performing the change impact analysis using the modified patch.

15. One or more non-transitory computer readable media capable of storing instructions executable by one or more processors to perform operations comprising:

determining that project code in a development system references an older version of a component in a third-party library;

determining that a newer version of the component in the third-party library has a fix commit that addresses a vulnerability in the older version of the component;

determining a subset of code changes associated with the fix commit that addresses the vulnerability in the older version of the component;

submitting, via a communication network, a pull request to create a branch in a developer platform;

creating, in the branch, a patch based on the subset of the code changes associated with the fix commit;

applying, in the branch, the patch to the older version of the component to create a patched component;

validating, in the branch, the patch;

after successfully validating the patch in the branch, uploading the patched component and information associated with the patch to a registry to enable a software developer to download and use the patched component; and providing sufficient details in the information associated with the patch to enable the software developer to reproducibly build the patch.

16. The one or more non-transitory computer readable media of claim 15, wherein validating the patch comprises: executing a set of test cases on a first build that includes the older version of the component to create first test results; determining that the first test results indicate that the set of test cases exploited the vulnerability in the older version of the component; executing the set of test cases on a second build that includes the patched component to create second test results; and determining that the second test results indicate that the set of test cases did not exploit the vulnerability in the patched component.

17. The one or more non-transitory computer readable media of claim 16, the operations further comprising: initiating a process to create the first build using a build file comprising build rules and build options; based on the process to create the first build failing, modifying the build file to create a modified build file; and re-initiating the process to create the first build using the modified build file.

18. The one or more non-transitory computer readable media of claim 15, wherein validating the patch comprises: executing a set of test cases on a first build that includes the older version of the component to create first test results; determining that the first test results indicate that the set of test cases exploited the vulnerability in the older version of the component; executing the set of test cases on a second build that includes the patched component to create second test results; determining that the second test results indicate that the set of test cases exploited the vulnerability in the patched component; modifying the patch to create a modified patch; executing the set of test cases on a third build that includes the modified patch to create third test results; and determining that the third test results indicate that the set of test cases did not exploit the vulnerability in the modified patch.

19. The one or more non-transitory computer readable media of claim 15, the operations further comprising:

performing a change impact analysis on the patched component;

determining, based on the change impact analysis, whether the patch introduces a breaking change; and in response to determining that the patch introduces a breaking change, modifying the patch to create a modified patch and performing the change impact analysis using the modified patch.

20. The one or more non-transitory computer readable media of claim 15, wherein the information associated with the patch comprises: information identifying the older version of the component in the third-party library; information identifying the vulnerability; information identifying files used; information related to a build file; information related to build options; one or more configuration details; or any combination thereof.

* * * * *